(12) United States Patent
Kurogi et al.

(10) Patent No.: US 10,294,635 B2
(45) Date of Patent: May 21, 2019

(54) DISPLAY DEVICE AND DISPLAY SYSTEM OF WORK MACHINE

(71) Applicant: Komatsu Ltd., Tokyo (JP)

(72) Inventors: Ryosuke Kurogi, Tokyo (JP); Toshihiro Koide, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/756,701

(22) PCT Filed: Jun. 28, 2017

(86) PCT No.: PCT/JP2017/023818
§ 371 (c)(1),
(2) Date: Mar. 1, 2018

(87) PCT Pub. No.: WO2017/191853
PCT Pub. Date: Nov. 9, 2017

(65) Prior Publication Data
US 2019/0003155 A1 Jan. 3, 2019

(51) Int. Cl.
*E02F 9/26* (2006.01)
*B60R 1/00* (2006.01)
*H04N 7/18* (2006.01)

(52) U.S. Cl.
CPC .............. *E02F 9/26* (2013.01); *B60R 1/00* (2013.01); *H04N 7/181* (2013.01); *B60R 2300/607* (2013.01); *B60R 2300/8093* (2013.01)

(58) Field of Classification Search
None
See application file for complete search history.

(56) References Cited

U.S. PATENT DOCUMENTS

| 6,111,498 | A | * | 8/2000 | Jobes, I | .................... | G07C 5/10 |
| | | | | | | 340/435 |
| 8,909,387 | B2 | | 12/2014 | Ikeya | | |
| 2008/0258896 | A1 | * | 10/2008 | Stoller | ...................... | B60R 1/00 |
| | | | | | | 340/459 |
| 2010/0245575 | A1 | * | 9/2010 | Mori | ........................ | B60R 1/00 |
| | | | | | | 348/148 |
| 2013/0166143 | A1 | | 6/2013 | Seki | | |
| 2013/0182066 | A1 | | 7/2013 | Ishimoto | | |
| 2016/0138240 | A1 | | 5/2016 | Ikegami et al. | | |
| 2016/0148421 | A1 | * | 5/2016 | Friend | ...................... | G06T 3/40 |
| | | | | | | 345/629 |

(Continued)

FOREIGN PATENT DOCUMENTS

CA 2959480 A1 11/2016
JP 2012-074929 A 4/2012

(Continued)

OTHER PUBLICATIONS

International Search Report dated Sep. 19, 2017, issued for PCT/JP2017/023818.

*Primary Examiner* — John F Mortell
(74) *Attorney, Agent, or Firm* — Locke Lord LLP

(57) ABSTRACT

A display device for a work machine includes a display control unit that, based on image data obtained by a camera installed in the work machine, displays a calibration screen including surrounding display data which indicates the surrounding situation of the work machine, and calibration display data which is used in the calibration of the work machine.

11 Claims, 11 Drawing Sheets

(56) References Cited

U.S. PATENT DOCUMENTS

2017/0030054 A1    2/2017   Okumura et al.

FOREIGN PATENT DOCUMENTS

| JP | 2012-202062 A | 10/2012 |
| JP | 2017-110472 A | 6/2017 |
| WO | 2011/074672 A1 | 6/2011 |
| WO | 2015/125979 A1 | 8/2015 |
| WO | 2015/137525 A1 | 9/2015 |
| WO | 2016/013686 A1 | 1/2016 |

* cited by examiner

DISPLAY DEVICE AND DISPLAY SYSTEM OF WORK MACHINE

FIELD

The present invention relates to a display device and a display system for a work machine.

BACKGROUND

In the technical field related to work machines; a technology is known in which display data indicating the surrounding situation of the concerned work machine is generated and is displayed on a display device installed in the operating room of the work machine. In Patent Literature 1, a technology is disclosed in which a bird's eye image of the concerned work machine is displayed on a monitor.

CITATION LIST

Patent Literature

Patent Literature 1: Japanese Patent Application Laid-open No. 2012-074929

SUMMARY

Technical Problem

As a result of displaying, on the display device, the display data indicating the surrounding situation of the work machine; the operator becomes able to visually confirm the surrounding situation of the work machine while the work machine is at work. Similarly, during the calibration of the work machine too, when at least some component of the work machine is to be actuated, there is a demand for a technology that enables the operator to visually confirm the surrounding situation of the work machine.

It is an object of the present invention to provide such a display device for a work machine which is capable of enabling visual confirmation of the surrounding situation of the work machine during the calibration of the work machine.

Solution to Problem

According to an aspect of the present invention, a display device for a work machine comprises a display control unit that, based on image data obtained by a camera installed in the work machine, displays a calibration screen including surrounding display data which indicates surrounding situation of the work machine, and calibration display data which is used in calibration of the work machine.

Advantageous Effects of Invention

According to an aspect of the present invention, a display device for a work machine is provided for enabling visual confirmation of the surrounding situation of the work machine during the calibration of the work machine.

DESCRIPTION OF EMBODIMENTS

An exemplary embodiment of the present invention is described below with reference to the accompanying drawings. However, the present invention is not limited to the embodiment described below. The constituent elements according to the embodiment described below can be appropriately combined. Moreover, there are times when some of the constituent elements are not used.

[Work Machine]

Figure 1:
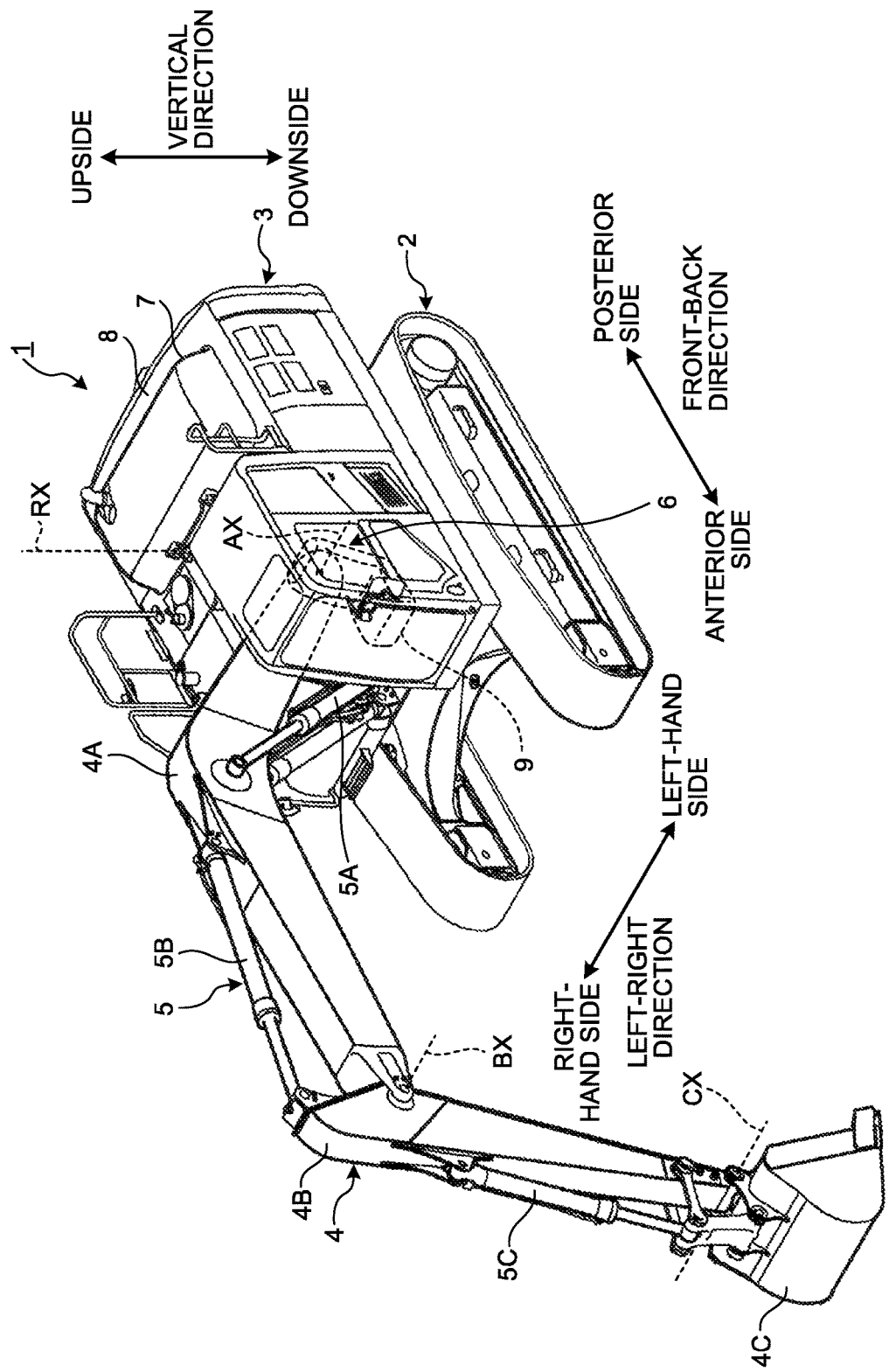
FIG. 1 is a perspective view illustrating an example of a work machine according to an embodiment.

FIG. 1 is a perspective view illustrating an example of a work machine 1 according to the present embodiment. In the present embodiment, the work machine 1 is assumed to be an excavator. Thus, in the following explanation, the work machine 1 is also referred to as the excavator 1.

As illustrated in FIG. 1, the excavator 1 includes a base carrier 2, an upper revolving structure 3 that is supported by the base carrier 2, a work equipment 4 that is supported by the upper revolving structure 3, and a hydraulic cylinder 5 that drives the work equipment 4.

The base carrier 2 is capable of travelling while supporting the upper revolving structure 3. The base carrier 2 includes a pair of crawler tracks. When the crawler tracks are rotated, the base carrier 2 travels.

The upper revolving structure 3 is capable of revolving around a revolution shaft RX while being supported by the base carrier 2. The upper revolving structure 3 includes an operating room 6 in which the operator of the excavator 1 sits. An operator seat 9 is disposed in the operating room 6 for the operator to sit on.

The work equipment 4 includes a boom 4A that is coupled with the upper revolving structure 3; an arm 4B that is coupled with the boom 4A; and a bucket 4C that is coupled with the arm 4B. The hydraulic cylinder 5 includes a boom cylinder 5A that drives the boom 4A; an arm cylinder 5B that drives the arm 4B; and a bucket cylinder 5C that drives the bucket 4C.

The boom 4A is supported by the upper revolving structure 3 in a rotatable manner around a boom rotary shaft AX. The arm 4B is supported by the boom 4A in a rotatable manner around an arm rotary shaft BX. The bucket 4C is supported by the arm 4B in a rotatable manner around a bucket rotary shaft CX.

The boom rotary shaft AX, the arm rotary shaft BX, and the bucket rotary shaft CX are parallel to each other. Thus, the boom rotary shaft AX, the arm rotary shaft BX, and the bucket rotary shaft CX are orthogonal to the shafts parallel to the revolution shaft RX. In the following explanation, the direction parallel to the revolution shaft RX is referred to as the vertical direction; the direction parallel to the boom rotary shaft AX, the arm rotary shaft BX, and the bucket rotary shaft CX is referred to as the right-left direction; and the direction that is orthogonal to the boom rotary shaft AX, the arm rotary shaft BX, and the bucket rotary shaft CX as well as orthogonal to the revolution shaft RX is referred to as the front-back direction. With reference to the operator sitting in the operator seat 9, the direction in which the work equipment 4 is installed represents the anterior side, and the opposite direction to the anterior side represents the posterior side. Moreover, with reference to the operator sitting in the operator seat 9, one side in the right-left direction represents the right-hand side and the opposite side to the right-hand side represents the left-hand side. Furthermore, the direction of moving away from the contact area of the base carrier 2 represents the upside, and the opposite direction to the upside represents the downside.

The upper revolving structure 3 includes a power container 7 and a counter weight 8. The power container 7 and the counter weight 8 are disposed in the rear portion of the upper revolving structure 3. The counter weight 8 is disposed on the posterior side of the power container 7. The power container 7 houses an engine, a hydraulic pump, a radiator, and an oil cooler.

The operating room 6 is provided in the anterior portion of the upper revolving structure 3. Moreover, the operating room 6 is provided on the left-hand side of the work equipment 4. Thus, the boom 4A of the work equipment 4 is disposed on the right-hand side of the operating room 6.

The excavator 1 is an ICT (Information and Communication Technology) excavator capable of implementing computer aided construction. The excavator 1 detects three-dimensional position data of the work equipment 4, and controls the work equipment 4 based on the three-dimensional position data of the work equipment 4 and a three-dimensional design aspect of the construction target. In the upper revolving structure 3 are installed absolute position sensors, which detect the position of the upper revolving structure 3 as defined using the global coordinates, and an inertial measurement unit (IMU), which detects the orientation of the upper revolving structure 3. There are two absolute position sensors installed in the excavator 1. The absolute position sensors make use of the global navigation satellite system (GNSS), and detect the position and the azimuth direction of the upper revolving structure 3. In the work equipment 4, a relative position sensor is installed for detecting the relative position between the upper revolving structure 3 and the bucket 4C. The relative position sensor includes at least either a stroke sensor for detecting the strokes of the hydraulic cylinder 5 or an angle sensor for detecting the angle of the work equipment 4. Based on the sensor data of the absolute position sensor, based on the measurement data of the inertial measurement unit, and based on the sensor data of the relative position sensor; the three-dimensional position data of the bucket 4C as defined in the global coordinates is detected. The three-dimensional design aspect of the construction target is defined in the global coordinates. The excavator 1 collates the three-dimensional position data of the bucket 4C and the three-dimensional design aspect of the construction target, and can control the work equipment 4 in such a way that the bucket 4C moves along the three-dimensional design aspect without exceeding the three-dimensional design aspect.

[Operating Room]

Figure 2:
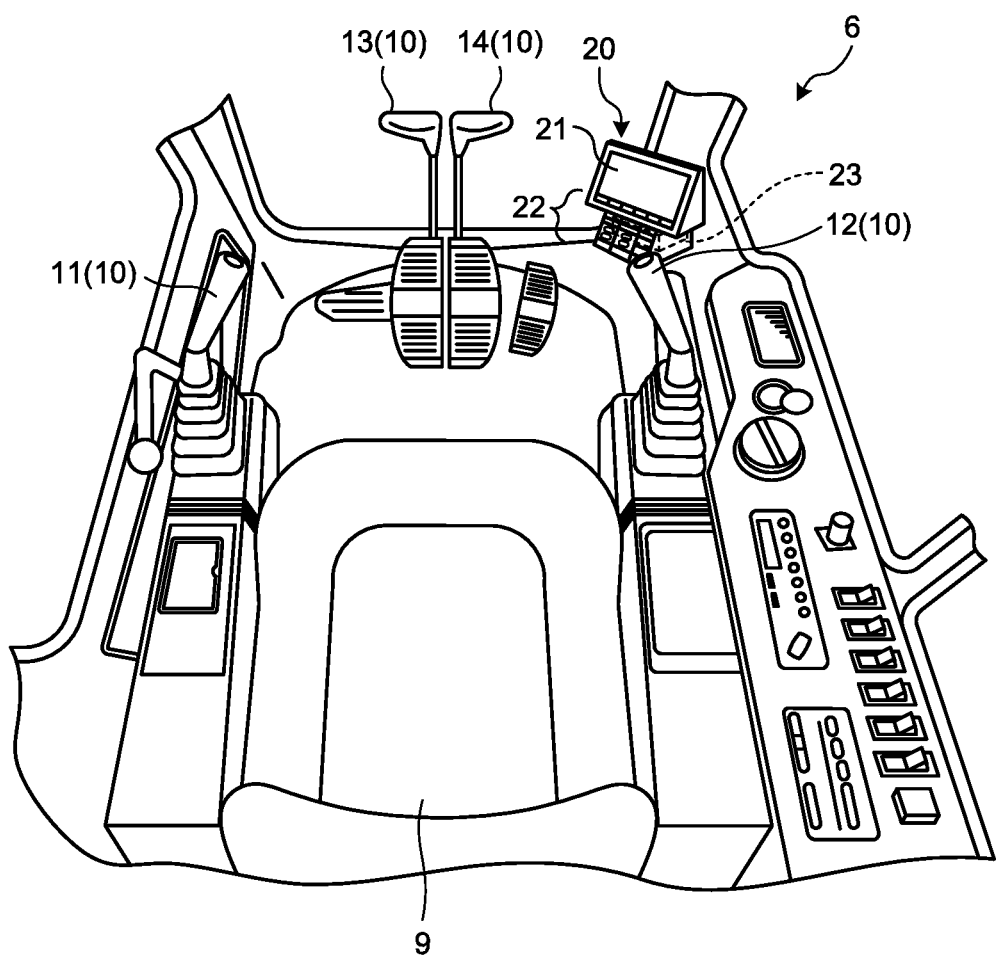
FIG. 2 is a diagram illustrating an example of an operating room of the work machine according to the present embodiment.

FIG. 2 is a diagram illustrating an example of the operating room 6 of the excavator 1 according to the present embodiment. As illustrated in FIG. 2, the operator seat 9 is disposed in the operating room 6 for the operator of the excavator 1 to sit on.

Moreover, an operation device 10 that is operated for actuating at least one component of the excavator 1 is disposed in the operating room 6. The operation device 10 is operated by the operator who is sitting in the operator seat 9. Herein, the actuation of the excavator 1 includes at least either the actuation of the base carrier 2, or the actuation of the upper revolving structure 3, or the actuation of the work equipment 4.

The actuation of the base carrier 2 includes at least either the forward movement or the backward movement of the left-side crawler track. Moreover, the actuation of the base carrier 2 includes at least either the forward movement or the backward movement of the right-side crawler track.

The actuation of the upper revolving structure 3 includes at least either the left-side revolution or the right-side revolution thereof.

The actuation of the work equipment 4 includes at least either an ascending movement or a descending movement of the boom 4A. Moreover, the actuation of the work equipment 4 includes at least either a dumping movement or a drilling movement of the arm 4B. Furthermore, the actuation of the work equipment 4 includes at least either a drilling movement or a dumping movement of the bucket 4C.

The operation device 10 includes a left-side work lever 11 and a right-side work lever 12 that are operated for actuating the upper revolving structure 3 and the work equipment 4; and includes a left-side traction lever 13 and a right-side traction lever 14 that are operated for actuating the base carrier 2.

The left-side work lever 11 is disposed on the left-hand side of the operator seat 9. The right-side work lever 12 is disposed on the right-hand side of the operator seat 9. When the left-side work lever 11 is operated in the front-back direction, the arm 4B performs a dumping movement or a drilling movement. When the left-side work lever 11 is operated in the right-left direction, the upper revolving structure 3 performs left-side revolution or right-side revolution. When the right-side work lever 12 is operated in the right-left direction, the bucket 4C performs a drilling movement or a dumping movement. When the right-side work lever 12 is operated in the front-back direction, the boom 4A performs a descending movement or an ascending movement. Meanwhile, alternatively, the configuration can be such that, when the left-side operation lever 11 is operated in the front-back direction, the upper revolving structure 3 performs left-side revolution or right-side revolution; and, when the left-side work lever 11 is operated in the right-left direction, the arm 4B performs a dumping movement or a drilling movement.

The left-side traction lever 13 and the right-side traction lever 14 are disposed on the anterior side of the operator seat 9. The left-side traction lever 13 is disposed on the left-hand side of the right-side traction lever 14. When the left-side traction lever 13 is operated in the front-back direction, the left-side crawler track of the base carrier 2 performs the forward movement or the backward movement. When the right-side traction lever 14 is operated in the front-back direction, the right-side crawler track of the base carrier 2 performs the forward movement or the backward movement.

When the left-side work lever 11 is placed in the neutral position, the arm 4B comes to a stop without getting actuated. Moreover, when the left-side work lever 11 is placed in the neutral position, the upper revolving structure 3 comes to a stop without getting actuated.

When the right-side work lever 12 is placed in the neutral position, the bucket 4C comes to a stop without getting actuated. Moreover, when the right-side work lever 12 is placed in the neutral position, the boom 4A comes to a stop without getting actuated.

When the left-side traction lever 13 is placed in the neutral position, the left-side crawler track of the base carrier 2 comes to a stop without getting actuated.

When the right-side traction lever 14 is placed in the neutral position, the right-side crawler track of the base carrier 2 comes to a stop without getting actuated.

In the following explanation, the state in which the left-side work lever 11 is placed in the neutral position is called the neutral state of the left-side work lever 11. On the other hand, the state in which the left-side work lever 11 is not placed in the neutral position but is being operated in at least one direction from among the left-hand direction, the right-hand direction, the anterior direction, and the posterior direction is called the operating state of the left-side work lever 11.

Moreover, in the following explanation, the state in which the right-side work lever 12 is placed in the neutral position is called the neutral state of the right-side work lever 12. On the other hand, the state in which the right-side work lever 12 is not placed in the neutral position but is being operated in at least one direction from among the left-hand direction, the right-hand direction, the anterior direction, and the posterior direction is called the operating state of the right-side work lever 12.

Furthermore, in the following explanation, the state in which the left-side traction lever 13 is placed in the neutral position is called the neutral state of the left-side traction lever 13. On the other hand, the state in which the left-side traction lever 13 is not placed in the neutral position but is being operated in at least either the anterior direction or the posterior direction is called the operating state of the left-side traction lever 13.

Moreover, in the following explanation, the state in which the right-side traction lever 14 is placed in the neutral position is called the neutral state of the right-side traction lever 14. On the other hand, the state in which the right-side traction lever 14 is not placed in the neutral position but is being operated in at least either the anterior direction or the posterior direction is called the operating state of the right-side traction lever 14.

Furthermore, in the following explanation, the state in which the left-side work lever 11, the right-side work lever 12, the left-side traction lever 13, and the right-side traction lever 14 are placed in the neutral state is called the neutral state of the operation device 10. On the other hand, the state in which at least one of the left-side work lever 11, the right-side work lever 12, the left-side traction lever 13, and the right-side traction lever 14 is in the operating state is called the operating state of the operation device 10.

When the operation device 10 is in the neutral state, the actuation of the base carrier 2, the upper revolving structure 3, and the work equipment 4 comes to a stop. When the operation device 10 is in the operating state, at least one of the base carrier 2, the upper revolving structure 3, and the work equipment 4 is actuated.

The excavator 1 includes a display device 20 that is installed in the operating room 6. The display device 20 is positioned on the right-hand anterior side of the operator seat 9. The display device 20 includes a display unit 21, an operating unit 22, and a control device 23.

The display unit 21 includes a flat panel display such as a liquid crystal display (LCD) or an organic electroluminescence display (OELD).

The operating unit 22 includes a plurality of switches to be operated by the operator. The switches provided in the operating unit 22 include function switches assigned with particular functions and a work mode setting switch for setting the work mode of the excavator 1.

Each work mode of the excavator 1 defines the output torque of the engine of the excavator 1. The work modes include a power mode (P mode) that enables excellent operability with a large output torque, and an eco-friendly mode (E mode) that gives excellent fuel efficiency with a small output torque. The operator can operate the work mode setting switch and select either the P mode or the E mode as the work mode.

Meanwhile, the switches of the operating unit 22 are not limited to the function switches and the work mode setting switch. Alternatively, the operating unit 22 can include touch-sensitive switches provided in the display screen of the display unit 21. That is, the display unit 21 can include a touch-sensitive panel having the functions of the operating unit 22.

[Camera]

Figure 3:
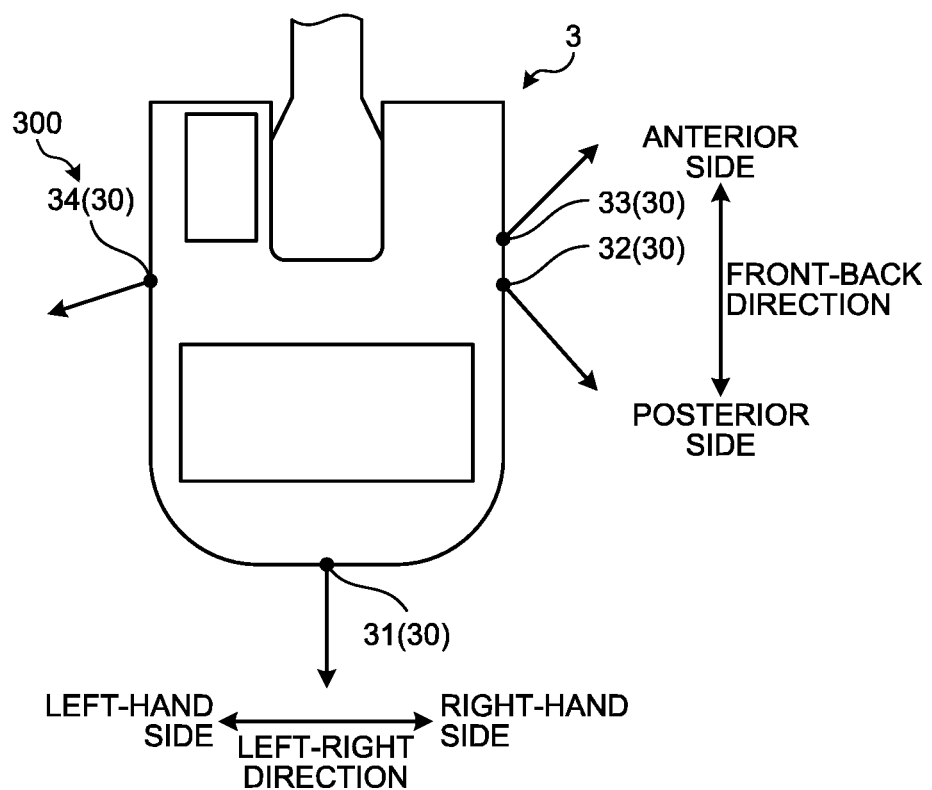
FIG. 3 is a diagram that schematically illustrates an example of an upper revolving structure according to the present embodiment.

FIG. 3 is a diagram that schematically illustrates an example of the upper revolving structure 3 according to the present embodiment. The excavator 1 includes a camera system 300 equipped with a plurality of cameras 30. The cameras 30 are installed in the upper revolving structure 3. The cameras 30 obtain videos of the filming targets. As illustrated in FIG. 3, the cameras 30 include a camera 31 installed in the rear portion of the upper revolving structure 3, cameras 32 and 33 installed in the right-side portion of the upper revolving structure 3, and a camera 34 installed in the left-side portion of the upper revolving structure 3.

The camera 31 films the posterior side of the upper revolving structure 3. The cameras 32 and 33 film the right-hand side of the upper revolving structure 3. The camera 32 films the right-hand posterior side of the upper revolving structure 3, while the camera 33 films the right-hand anterior side of the upper revolving structure 3. The camera 34 films the left-hand side of the upper revolving structure 3. Each of the cameras 30 (31, 32, 33, and 34) includes an optical system and an image sensor. The image sensor is either a CCD (Couple Charged Device) image sensor or a CMOS (Complementary Metal Oxide Semiconductor) image sensor.

[Display Device]

Figure 4:
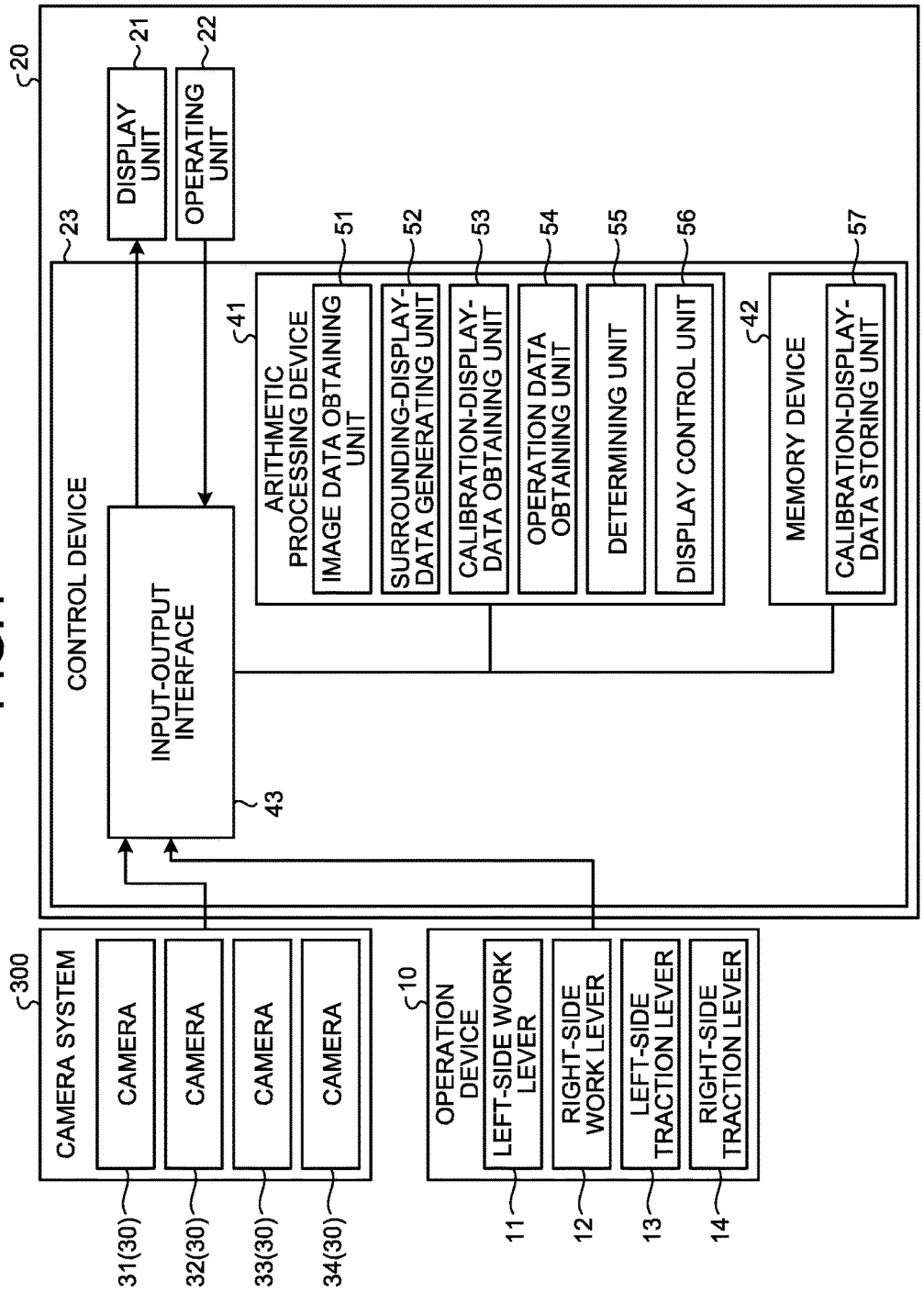
FIG. 4 is a functional block diagram illustrating an example of a display device according to the present embodiment.

FIG. 4 is a functional block diagram illustrating an example of the display device 20 according to the present embodiment. The display device 20 includes the display unit 21, the operating unit 22, and the control device 23. Meanwhile, the display unit 21 and the operating unit 22 can be configured as separate constituent elements. Moreover, the display unit 21 and the control device 23 can be configured as separate constituent elements.

The control device 23 is equipped with a computer system. The control device 23 includes an arithmetic processing device 41 having a processor such as a CPU (Central Processing Unit); a memory device 42 having a volatile memory such a RAM (Random Access Memory) and a nonvolatile memory such as a ROM (Read Only Memory); and an input-output interface 43.

The input-output interface 43 is connected to the camera system 300 and the operation device 10. The camera system 300 includes a plurality of cameras 30 (31, 32, 33, and 34). The operation device 10 includes the left-side work lever 11, the right-side work lever 12, the left-side traction lever 13, and the right-side traction lever 14.

The arithmetic processing device 41 includes an image data obtaining unit 51, a surrounding-display-data generating unit 52, a calibration-display-data obtaining unit 53, an operation data obtaining unit 54, a determining unit 55, and a display control unit 56.

The image data obtaining unit 51 obtains image data from a plurality of cameras 30 (31, 32, 33, and 34) installed in the excavator 1. From the camera 31, the image data obtaining unit 51 obtains image data indicating the situation on the posterior side of the excavator 1. Moreover, from the cameras 32 and 33, the image data obtaining unit 51 obtains image data indicating the situation on the right-hand side of the excavator 1. Furthermore, from the camera 34, the image data obtaining unit 51 obtains image data indicating the situation on the left-hand side of the excavator 1.

The surrounding-display-data generating unit 52 generates, based on the image data obtained by the cameras 30 installed in the excavator 1, surrounding display data Sa indicating the surrounding situation of the excavator 1. The surrounding-display-data generating unit 52 obtains image data, which is taken by the cameras 30, from the image data obtaining unit 51; and generates the surrounding display data Sa to be displayed on the display unit 21. The surrounding display data Sa contains first-type surrounding display data Sa1 and second-type surrounding display data Sa2. In the present embodiment, the first-type surrounding display data Sa1 contains a bird's eye image of the surrounding of the excavator 1 as generated based on the image data obtained by the cameras 30. The second-type surrounding display data Sa2 contains a single-camera image generated based on the image data obtained by one of the cameras 30. Based on the image data obtained by the cameras 30, the surrounding-display-data generating unit 52 generates a bird's eye image Sa1 to be displayed on the display unit 21. Moreover, based on the image data obtained by one of the cameras 30, the surrounding-display-data generating unit 52 generates a single-camera image Sa2 to be displayed on the display unit 21.

The calibration-display-data obtaining unit 53 obtains calibration display data Sb that is used in performing the calibration of the excavator 1. Herein, the excavator 1 is an ICT excavator, and the calibration thereof is the operation of deriving the correlation between the amount of movement of the spool of the hydraulic valve of the hydraulic cylinder 5 and the start of actuation of the hydraulic cylinder 5. The memory device 42 includes a calibration-display-data storing unit 57 for storing the calibration display data Sb. The calibration display data Sb contains at least either character data or image data. The calibration-display-data obtaining unit 53 obtains, from the calibration-display-data storing unit 57, the calibration display data Sb that is to be displayed on the display unit 21.

The operation data obtaining unit 54 obtains operation data from the operation device 10. In the neutral state of the operation device 10, operation data indicating that the operation device 10 is in the neutral state is output to the control device 23. In the operating state of the operation device 10, operation data indicating that the operation device 10 is in the operating state is output to the control device 23. The operation data obtaining unit 54 obtains, from the operation device 10, at least either operation data indicating that the operation device 10 is in the neutral state or operation data indicating that the operation device 10 is in the operating state.

The determining unit 55 determines, based on the operation data obtained by the operation data obtaining unit 54, whether or not the operation device 10 is in the neutral state. The determining unit 55 outputs a determination signal indicating the result of determination about whether or not the operation device 10 is in the neutral state. When it is determined that the operation device 10 is in the neutral state, the determining unit 55 outputs a determination signal indicating that the operation device 10 is in the neutral state. When it is determined that the operation device 10 is in the operating state, the determining unit 55 outputs a determination signal indicating that the operation device 10 is in the operating state.

The display control unit 56 outputs display data that is to be displayed on the display unit 21. The display control unit 56 displays, on the display unit 21, a calibration screen A that includes the calibration display data Sb, which is used in performing the calibration of the excavator 1, and the surrounding display data Sa. Herein, the display control unit 56 displays the surrounding display data Sa and the calibration display data Sb side-by-side in the same screen on the display unit 21. Moreover, the display control unit 56 displays, on the display unit 21, a standard screen B that includes the bird's eye image Sa1, which represents the first-type surrounding display data, and the single-camera image Sa2, which represents the second-type surrounding display data. The standard screen B does not include the calibration display data Sb. Furthermore, the display control unit 56 displays a main menu screen C on the display unit 21.

[Screen Transition Among Calibration Screen, Standard Screen, and Main Menu Screen]

Figure 5:
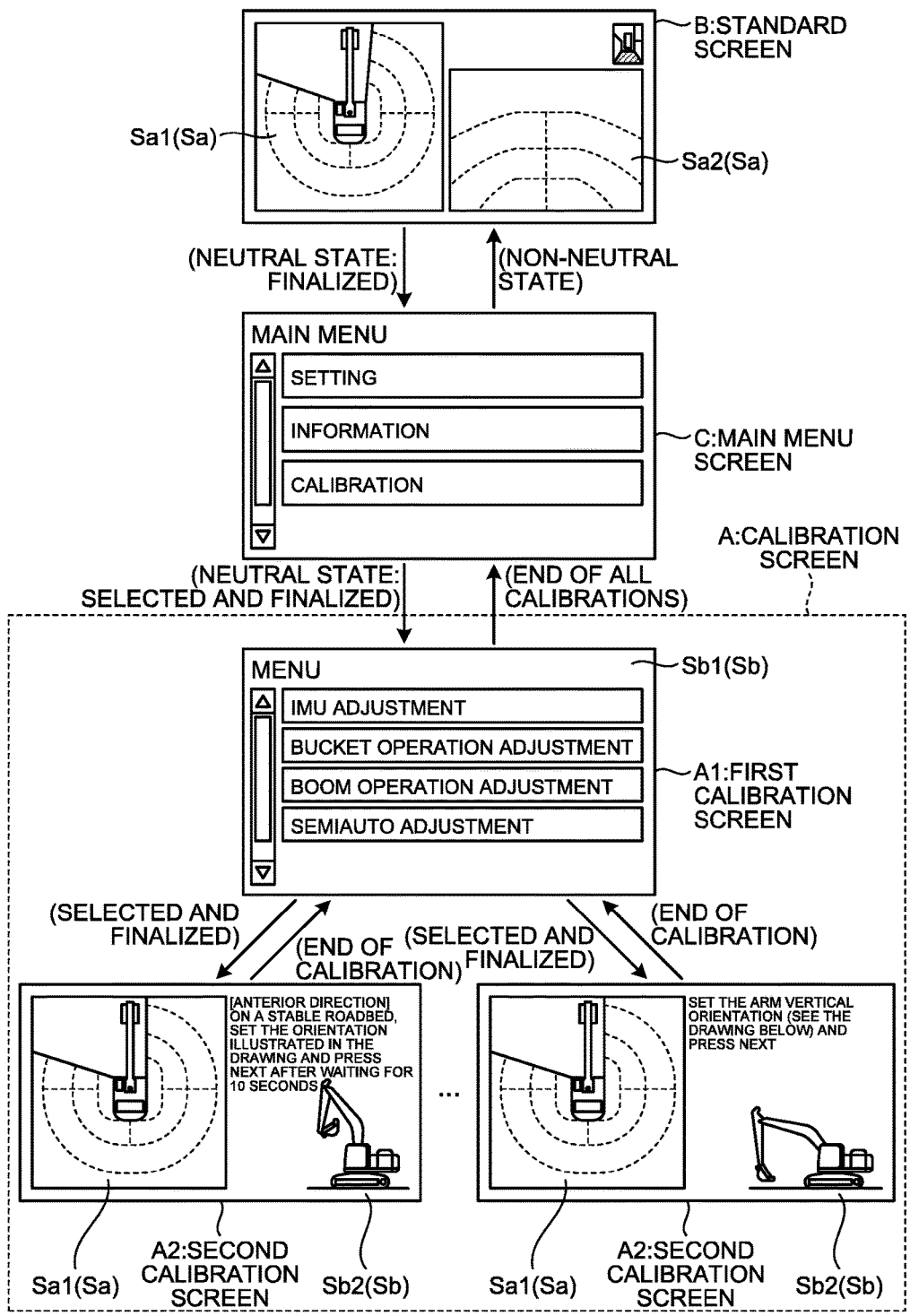
FIG. 5 is a diagram illustrating an example of screen transition among a calibration screen, a standard screen, and a main menu screen according to the present embodiment.

FIG. 5 is a diagram illustrating an example of screen transition among the calibration screen A, the standard screen B, and the main menu screen C according to the present embodiment. During the calibration of the excavator 1, the calibration screen A is displayed on the display unit 21. Moreover, while the excavator 1 is at work, the standard screen B is displayed on the display unit 21. Furthermore, the main menu screen C is displayed on the display unit 21.

The standard screen B is displayed while the excavator 1 is at work. The standard screen B is the initial screen that is initially displayed after the key switch of the excavator 1 is turned ON. The standard screen B does not include the calibration display data Sb but includes the surrounding display data Sa. That is, in the standard screen B, the calibration display area Sb is not displayed, but the surrounding display data Sa is displayed.

The surrounding display data Sa is generated by the surrounding-display-data generating unit 52. As illustrated in FIG. 5, the standard screen B includes the bird's eye image Sa1 that is of the surrounding of the excavator 1 and that is generated by converting the image data obtained by the cameras 30 to have a top view and then synthesizing the image data; and includes the single-camera image Sa2 that represents the image data of some part of the surrounding of the excavator 1 as obtained by one of the cameras 30.

The bird's eye image Sa1 is generated by converting the single-camera image Sa2 obtained from each of the cameras 30 (31, 32, 33, and 34) to have a top view, and then synthesizing the single-camera images Sa2. Based on the single-camera image Sa2 obtained by each of the cameras 30, the surrounding-display-data generating unit 52 generates the bird's eye image Sa1 of the surrounding of the excavator 1.

The single-camera image Sa2 includes at least either a posterior-side single-camera image that is obtained by the camera 31 and that indicates the situation on the posterior side of the excavator 1, or a right-side single-camera image that is obtained by at least either the camera 32 or the camera 33 and that indicates the situation on the right-hand side of the excavator 1, or a left-side camera image that is obtained by the camera 34 and that indicates the situation on the left-hand side of the excavator 1.

The main menu screen C displays a plurality of menus meant for various settings of the excavator 1 and meant for the confirmation of the situation. As illustrated in FIG. 5, the main menu screen C does not include the surrounding display data. The main menu screen C includes menus for calibration. The main menu screen C is operated by the operator of the excavator 1. When the operator selects and finalizes on "calibration", the menus for calibration of the excavator 1 are displayed on the display unit 21. Moreover, in the example illustrated in FIG. 5, "setting" and "information" are displayed as menus on the display unit 21. When the operator selects and finalizes on "setting", menus for performing the setting of the devices installed in the excavator 1 are displayed on the display unit 21. For example, a menu for performing the setting of the display format of the display unit 21 is displayed on the display unit 21. When "information" is selected and finalized, menus regarding the information of the devices installed in the excavator 1 are displayed on the display unit 21. For example, a menu for monitoring a detection signal of the absolute position sensor or a detection signal of the relative position sensor is displayed on the display unit 21. Meanwhile, the menus displayed in the main menu screen C are not limited to the example illustrated in FIG. 5. Moreover, there can be a plurality of main menu screens C. For example, depending on the operator, the display of a first main menu screen C can be changed to the display of a second main menu screen C.

The calibration screen A is displayed at the time of performing the calibration of the excavator 1. As described earlier, the excavator 1 is an ICT excavator in which the work equipment 4 is controlled based on the three-dimensional data of the work equipment 4 and the three-dimensional design aspect of the construction target. For the purpose of controlling the work equipment 4, in the excavator 1, calibration is performed that represents the operation of, for example, deriving the correlation between the amount of movement of the spool of the hydraulic valve of the hydraulic cylinder 5 and the start of actuation of the hydraulic cylinder 5. The calibration is performed either periodically or as may be necessary. During the calibration of the excavator 1, the display device 20 displays the calibration screen A on the display unit 21.

The calibration screen A includes the surrounding display data Sa indicating the surrounding situation of the excavator 1, and includes the calibration display data Sb used in performing the calibration of the excavator 1. In the calibration screen A, the surrounding display data Sa and the calibration display data Sb are displayed side-by-side.

The calibration display data Sb includes menu display data Sb1, which indicates the menus for calibration of the excavator 1, and guidance display data Sb2, which prompts the actuation of the excavator 1. The guidance display data Sb2 prompts the operation of the operation device 10 for the purpose of actuating at least one component of the excavator 1. The calibration screen A includes a first calibration screen A1 in which the menu display data Sb1 is displayed, and includes a second calibration screen A2 in which the guidance display data Sb2 and the surrounding display data Sa are displayed.

In the first calibration screen A1, the surrounding display data Sa is not displayed, but the menu display data Sb1 is displayed. In the case of displaying the menu display data Sb1 on the display unit 21, the display control unit 56 does not display the surrounding display data Sa on the display unit 21. That is, when the menu display data Sb1 is displayed, the surrounding display data Sa is not displayed.

In the second calibration screen A2, the surrounding display data Sa is displayed along with the guidance display data Sb2. In the case of displaying the guidance display data Sb2 on the display unit 21, the display control unit 56 displays the guidance display data Sb2 and the surrounding display data Sa side-by-side on the display unit 21. That is, when the guidance display data Sb2 is displayed on the display unit 21, the surrounding display data Sa is displayed along with the guidance display data Sb2 on the display unit 21.

When the standard screen B is being displayed, if the operating unit 22 is operated in the neutral state of the operation device 10, then the screen on the display unit 21 changes from the standard screen B to the main menu screen C.

When the main menu screen C is being displayed, if the operating unit 22 is operated in the neutral state of the operation device 10 and if "calibration" is selected and finalized from the menus displayed in the main menu screen C, then the screen on the display unit 21 changes from the main menu screen C to the first calibration screen A1.

When the first calibration screen A1 is being displayed, if the operating unit 22 is operated in the neutral state of the operation device 10 and if one of a plurality of calibration menus is selected and finalized in the first calibration screen A1, then the screen on the display unit 21 changes from the first calibration screen A1 to the second calibration screen A2.

When the second calibration screen A2 is being displayed, when the calibration is finished and when the operation device 10 is in the neutral state, the screen on the display unit 21 changes from the second calibration screen A2 to the first calibration screen A1.

When the first calibration screen A1 is being displayed, when all calibrations are finished and when the operation device 10 is in the neutral state, the screen on the display unit 21 changes from the first calibration screen A1 to the main menu screen C.

When the main menu screen C is being displayed, if the operation device 10 is operated so that it switches to the operating state, then the screen on the display unit 21 changes from the main menu screen C to the standard screen B.

[Bird's Eye Image Generation Method]

Figure 6:
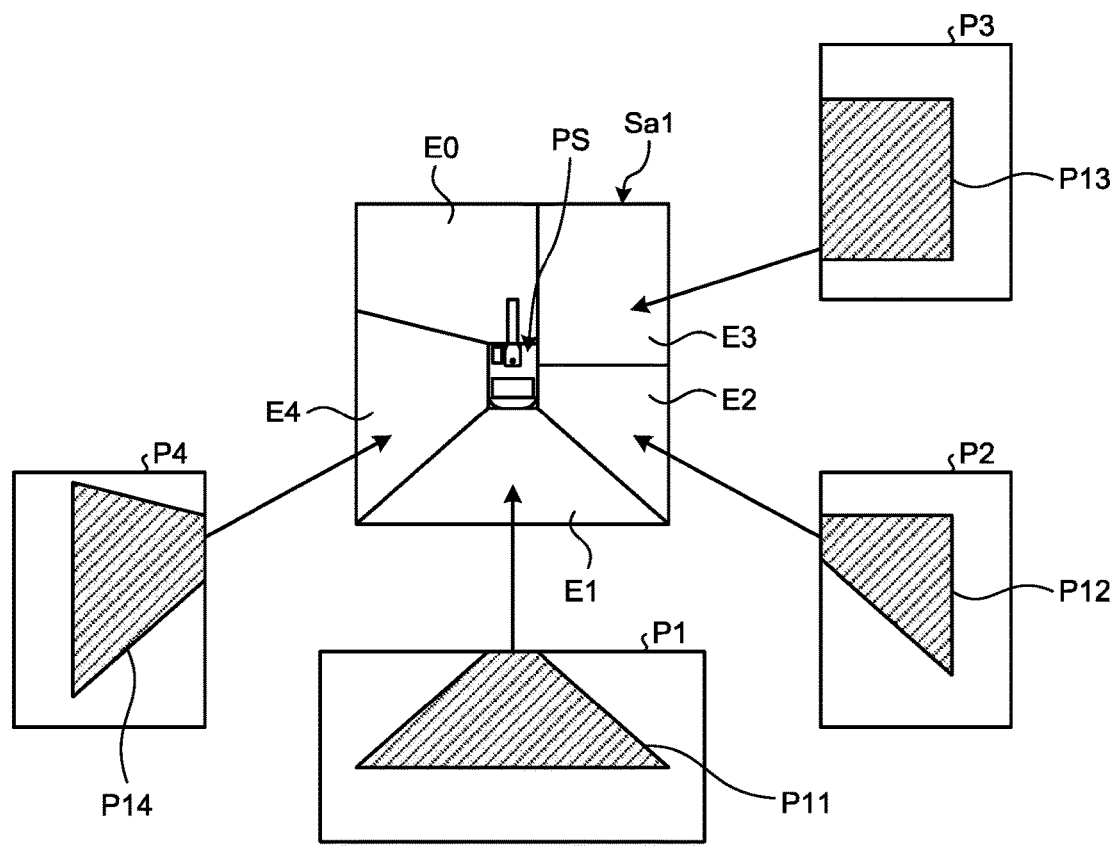
FIG. 6 is a schematic diagram for explaining an example of a bird's eye image generation method according to the present embodiment.

FIG. 6 is a schematic diagram for explaining an example of a bird's eye image generation method according to the present embodiment. As illustrated in FIG. 6, based on the image data obtained by the cameras 30 (31, 32, 33, and 34), the surrounding-display-data generating unit 52 generates the bird's eye image Sa1 of the surrounding of the excavator 1.

As illustrated in FIG. 6, the surrounding-display-data generating unit 52 converts sets of image data P1, P2, P3, and P4, which are respectively obtained by the cameras 31, 32, 33, and 34, into sets of converted image data P11, P12, P13, and P14 indicating top-view images viewed from a virtual viewpoint above the excavator 1.

From the sets of converted image data P11, P12, P13, and P14; the surrounding display data generating unit 52 clips portions corresponding to frame areas E1, E2, E3, and E4, respectively, in which the bird's eye image Sa1 is to be displayed. Then, the surrounding-display-data generating unit 52 synthesizes the converted image data P11, P12, 13, and P14 that has been clipped. As a result, the bird's eye image Sa1 of the surrounding of the excavator 1 gets generated. Moreover, the surrounding-display-data generating unit 52 adds a character image PS to the bird's eye image Sa1. The character image PS is equivalent to an image in which the excavator 1 is viewed from above. Because of the character image PS, the positional relationship between the excavator 1 and the surrounding thereof becomes clear.

Meanwhile, the bird's eye image Sa1 is not generated in a frame E0 present in the anterior and left-side anterior directions of the operating room 6. Thus, the operator sitting in the operator seat 9 becomes able to directly visually confirm the situation in the anterior and left-side anterior directions of the operating room 6. For that reason, no camera 30 is disposed to obtain image data indicating the situation in the anterior and left-side anterior directions of the operating room 6. With that, the number of cameras 30 installed in the excavator 1 can also be reduced. However, alternatively, a camera 30 can be installed for obtaining image data indicating the situation in the anterior and left-side anterior directions of the operating room 6, and the bird's eye image Sa1 can be generated in the frame area E0.

[Standard Screen]

Figure 7:
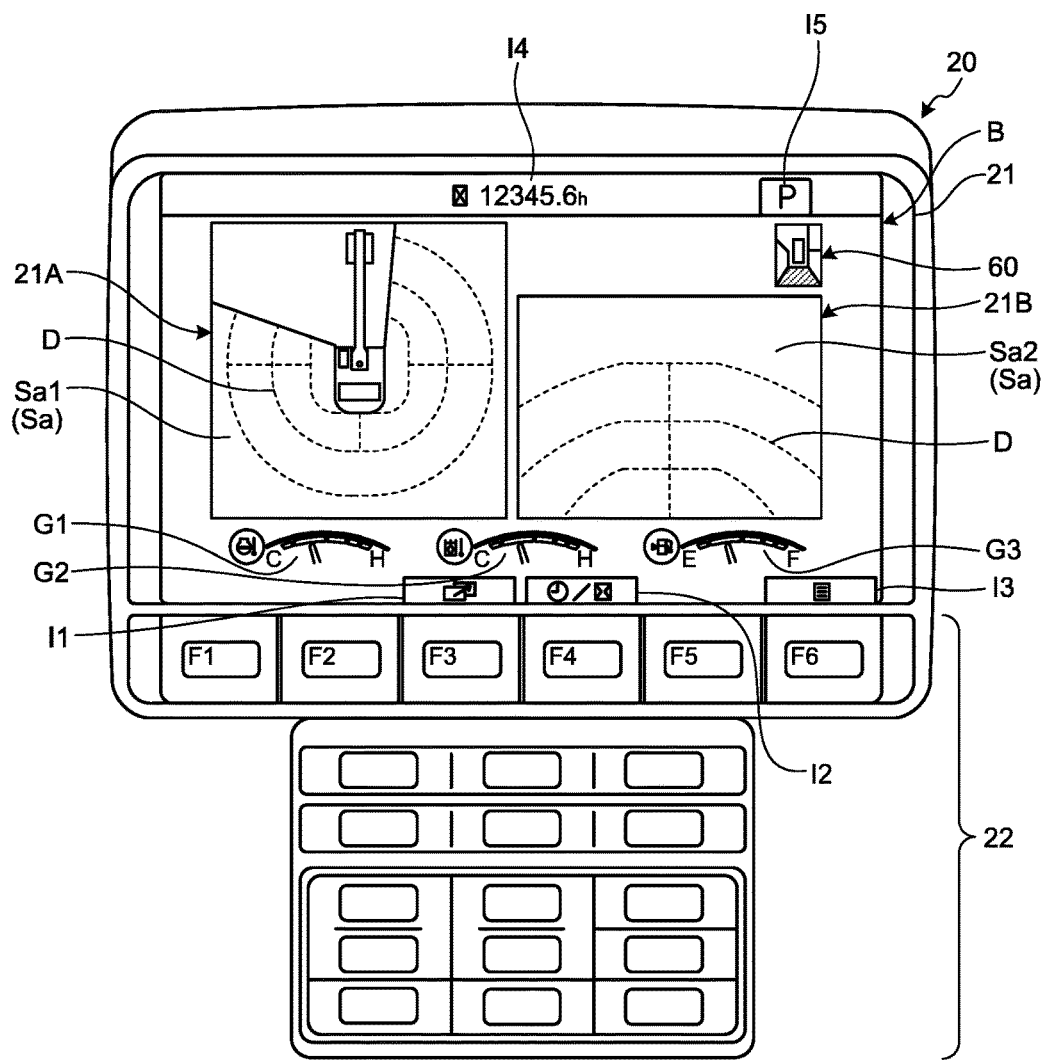
FIG. 7 is a diagram illustrating an example of the standard screen according to the present embodiment.

FIG. 7 is a diagram illustrating an example of the standard screen B according to the present embodiment. As illustrated in FIG. 7, the standard screen B does not display the calibration display data Sb but displays the surrounding display data Sa generated by the surrounding-display-data generating unit 52.

The standard screen B includes the bird's eye image Sa1, which represents the first-type surrounding display data, and the single-camera image Sa2, which represents the second-type surrounding display data that is displayed along with the bird's eye image Sa1. In the standard screen B, the display control unit 56 displays the bird's eye image Sa1 in a first area 21A of the display screen of the display unit 21, and displays the single-camera image Sa2 in a second area 21B of the display screen of the display unit 21.

The first area 21A and the second area 21B are set in the middle portion in the vertical direction of the display screen of the display unit 21. The first area 21A is set on the left-hand side of the second area 21B. That is, the bird's eye image Sa1 and the single camera image Sa2 are displayed in the middle portion in the vertical direction of the display screen of the display unit 21, and are displayed side-by-side in the right-left direction.

In the example illustrated in FIG. 7, the single-camera image Sa2 that is displayed in the second area 21B is a posterior-side single-camera image obtained by the camera 31 and indicates the situation on the posterior side of the excavator 1. The single-camera image Sa2 that is displayed in the second area 21B either can be a single-camera image that is obtained at least either by the camera 32 or by the camera 33 and that indicates the situation on the right-hand side of the excavator 1, or can be a single-camera image that is obtained by the camera 34 and that indicates the situation on the left-hand side of the excavator 1.

Meanwhile, the bird's eye image Sa1 and the single-camera image Sa2 include reference lines D that give a rough indication of the distance and the direction from the revolution shaft RX of the upper revolving structure 3.

In the display screen of the display unit 21, a single-camera-image position icon 60 is displayed on the top right of the single-camera image Sa2. The single-camera-image position icon 60 indicates the direction of the single-camera image Sa2, which is displayed in the second area 21B, from the excavator 1. In the example illustrated in FIG. 7, the single-camera-image position icon 60 includes an identification area indicating that the single-camera image Sa2 is a posterior-side single-camera image taken by the camera 31. The identification area can be illustrated with hatching or can have a different color than the remaining area.

The standard screen B includes display data indicating the state of the excavator 1. For example, the display data indicating the state of the excavator 1 contains water temperature data indicating the temperature of the coolant water of the engine and contains remaining-fuel data indicating the remaining level of the fuel. In the example illustrated in FIG. 7, the standard screen B includes an engine water-temperature gauge G1 that is displayed on the bottom left of the display screen of the display unit 21 and that indicates the temperature of the coolant water of the engine; includes an oil temperature gauge G2 that is displayed in the lower middle portion of the display unit 21 and that indicates the temperature of the hydraulic oil of the hydraulic machine; and a fuel level gauge G3 that indicates the remaining level of the fuel.

The operating unit 22 includes a plurality of function switches F1, F2, F3, F4, F5, and F6 disposed in the lower portion of the display screen of the display unit 21. The function switches F1, F2, F3, F4, F5, and F6 are assigned with particular functions. In the lower portion of the display screen of the display unit 21, a plurality of icons is displayed. The icons are displayed immediately above the function switches F1, F2, F3, F4, F5, and F6. When the operator operates the function switches F1, F2, F3, F4, F5, and F6; operation signals of particular functions corresponding to the icons, which are displayed immediately above, are generated.

In the example illustrated in FIG. 7, a plurality of icons I1, I2, and I3 is displayed in the lower portion of the display screen of the display unit 21. The icon I1 is displayed immediately above the function switch F3. The icon I2 is displayed immediately above the function switch F4. The icon I3 is displayed immediately above the function switch F6.

The icon I1 is used for switching the display area of the single-camera image Sa2 in the display screen of the display unit 21 from the second area 21B to all areas of the display screen of the display unit 21. When the function switch F3 is operated, the single-camera image Sa2 that is displayed in the second area 21B gets displayed in all areas of the display screen of the display unit 21. In this way, the function switch F3 enables switching the display of the single-camera image Sa2 from a window display to a full-screen display.

The icon I2 is used for changing the single-camera image Sa2 displayed in the second area 21B. When the function switch F4 is operated, the single-camera image Sa2 displayed in the second area 21B is changed to either the posterior-side single camera image, or the right-side single camera image, or the left-side single camera image.

The icon I3 is used for changing the standard screen B to the main menu screen C. When the standard screen B is being displayed, if the function switch F6 of the operating unit 22 is operated, then the main menu screen C gets displayed on the display unit 21.

Moreover, as illustrated in FIG. 7, a plurality of icons I4 and I5 is displayed in the upper portion of the display unit 21. The icon I4 indicates the value of a service meter. The icon I5 indicates the work mode that has been set. In the example illustrated in FIG. 7, the icon I5 includes the character "P" indicating that the P mode has been set as the work mode. When the E mode is set as the work mode, the character "E" is displayed in the icon I5.

[Calibration Screen]

Figure 8:
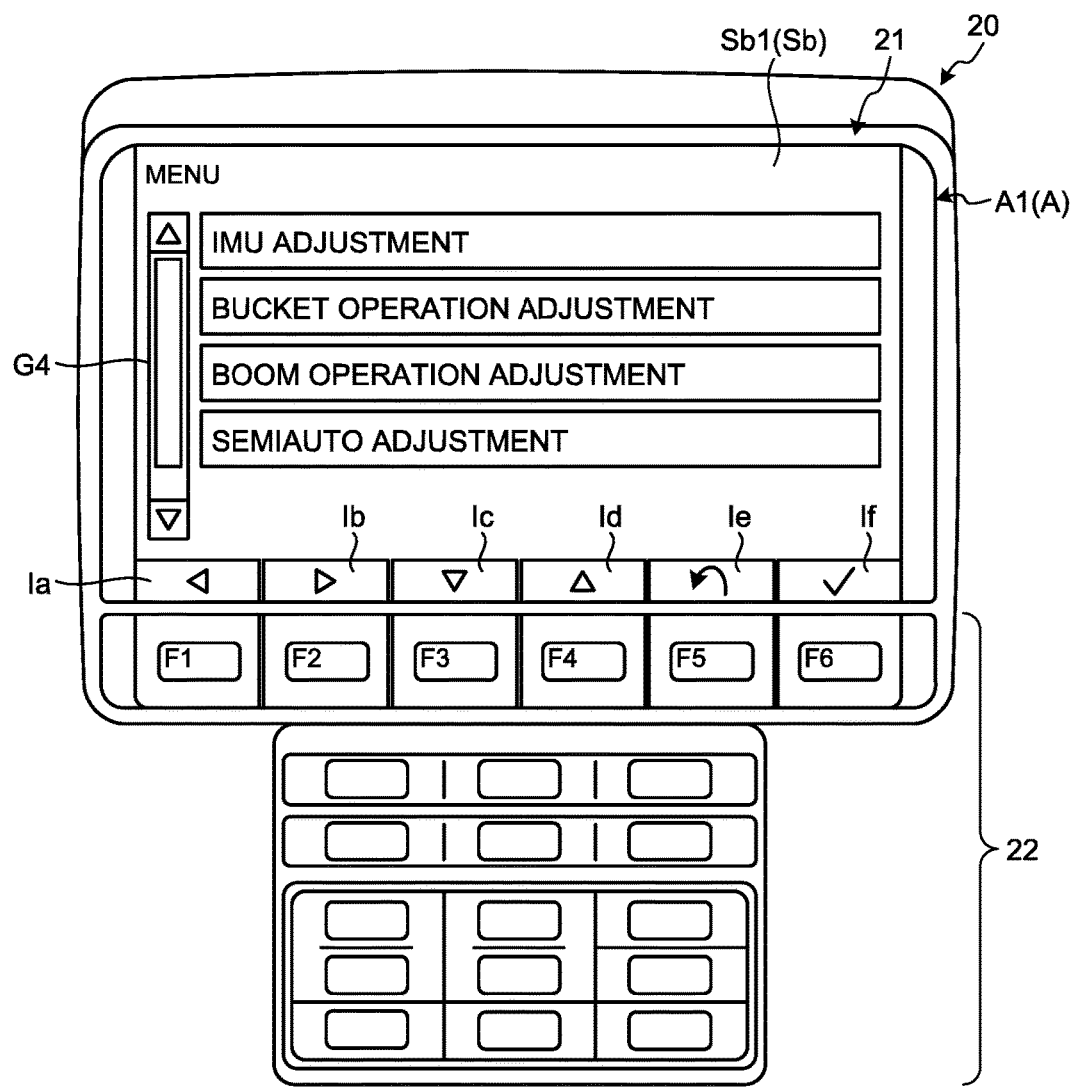
FIG. 8 is a diagram illustrating an example of the calibration screen according to the present embodiment.
Figure 9:
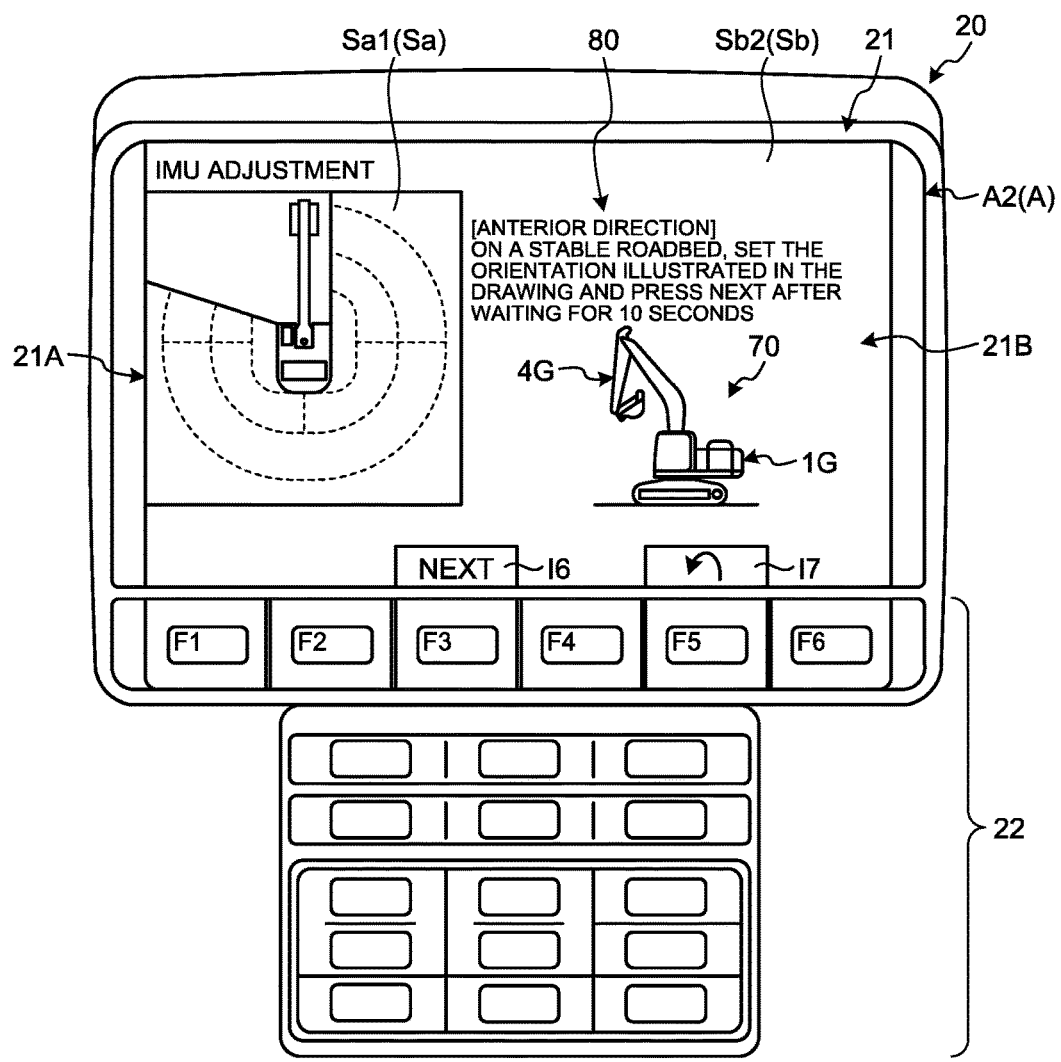
FIG. 9 is a diagram illustrating an example of the calibration screen according to the present embodiment.
Figure 10:
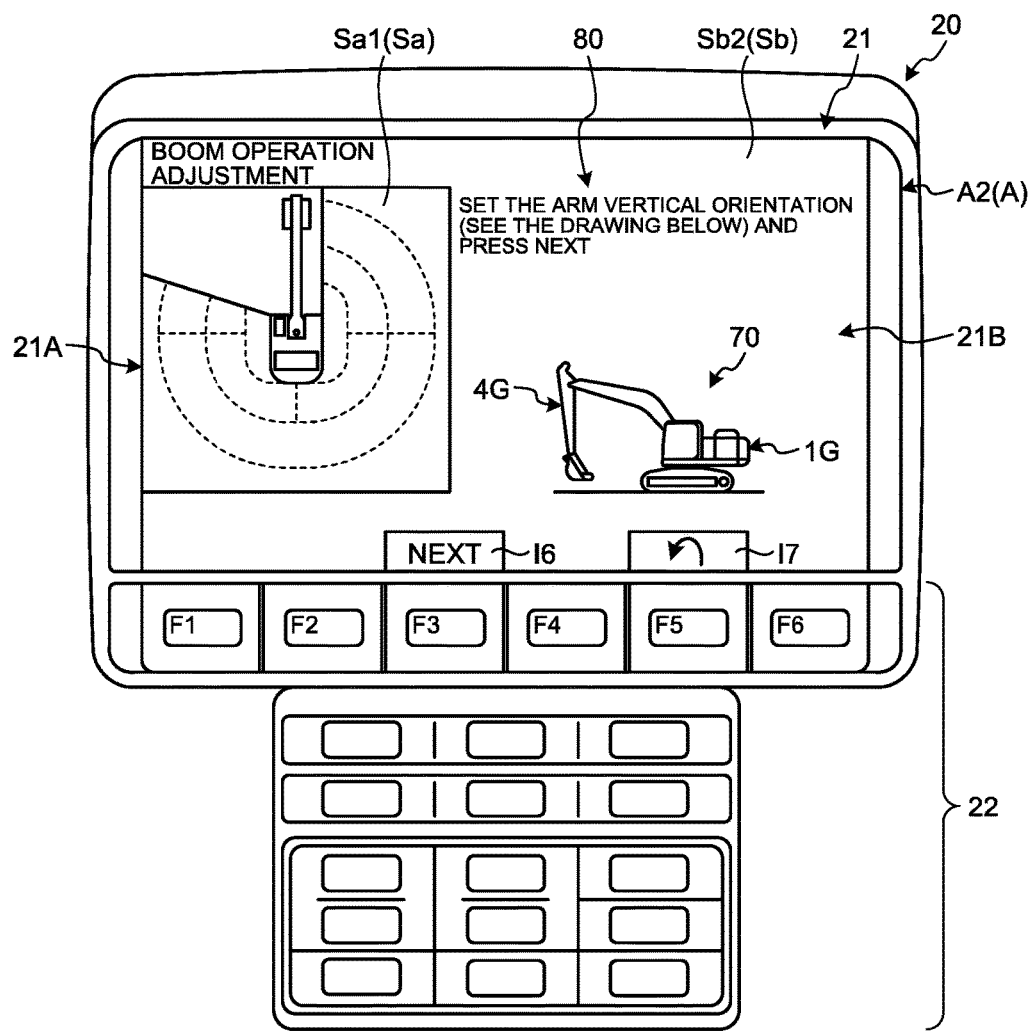
FIG. 10 is a diagram illustrating an example of the calibration screen according to the present embodiment.

FIGS. 8, 9, and 10 are diagrams illustrating an example of the calibration screen A according to the present embodiment. In FIG. 8 is illustrated an example of the first calibration screen A1 that includes the menu display data Sb1. In FIGS. 9 and 10 are illustrated an example of the second calibration screen A2 that includes the guidance display data Sb2.

As illustrated in FIG. 8, in the first calibration screen A1, the surrounding display data Sa is not displayed, but the menu display data Sb1 representing the calibration display data Sb is displayed. The display control unit 56 does not display the surrounding display data Sa on the display unit 21 while displaying the menu display data Sb1. In the example illustrated in FIG. 8, as the calibration menus of the excavator 1; "IMU adjustment", "packet operation adjustment", "boom operation adjustment", and "semiauto adjustment" are displayed on the display unit 21. The operator can operate the operating unit 22 and select one of the calibration menus displayed on the display unit 21. Based on the selected calibration menus, the calibration of the excavator 1 is performed.

In the example illustrated in FIG. 8, immediately above the function switches F1, F2, F3, F4, F5, and F6; icons Ia, Ib, Ic, Id, Ie, and If, respectively, are displayed. When one of the function switches F1, F2, F3, and F4 is operated, the selected calibration menu changes to a calibration menu in the vertical direction or the right-left direction. The operator operates one of the function switches F1, F2, F3, and F4 and selects the calibration menu. When the function switch F5 is operated, the display on the display unit 21 returns from the first calibration screen A1 to the main menu screen C that is the previous screen of the first calibration screen A1. When the function switch F6 is operated, the selected calibration menu gets finalized.

In the example illustrated in FIG. 8, on the left-hand portion of the display screen of the display unit 21, an indicator G4 is displayed for indicating the amount of scrolling of the first calibration screen A1.

In FIG. 9 is illustrated an example of the second calibration screen A2 at the time when the "IMU adjustment" menu, which is one of the calibration menus of the excavator 1, is selected and finalized in the first calibration screen A1. When the "IMU adjustment" menu is selected and finalized in the first calibration screen A1, the display control unit 56 changes the first calibration screen A1 to the second calibration screen A2 in the display unit 21. In the excavator 1, an inertial measurement unit (IMU) is installed for detecting the orientation of the upper revolving structure 3. When the "IMU adjustment" menu is selected and finalized, the calibration of the inertial measurement unit is performed.

As illustrated in FIG. 9, in the second calibration screen A2 are displayed the bird's eye image Sa1, which represents the surrounding display data Sa, and the guidance display data Sb2, which represents the calibration display data Sb. Herein, the bird's eye image Sa1 and the guidance display data Sb2 are displayed side-by-side. In the second calibration screen A2, the display control unit 56 displays the bird's eye image Sa1 in the first area 21A of the display screen of the display unit 21 and displays the guidance display data Sb2 in the second area 21B on the display screen of the display unit 21.

An icon I6 is displayed immediately above the function switch F3. An icon I7 is displayed immediately above the function switch F5. The icon I6 includes character data "NEXT". When the function switch F3 is operated, the screen on the display unit 21 changes from the second calibration screen A2 to the subsequent screen of the second calibration screen A2. When the function switch F5 is operated, the display on the display unit 21 returns from the second calibration screen A2 to the first calibration screen A1 that is the previous screen of the second calibration screen A2.

As illustrated in FIGS. 7 and 9, in the standard screen B as well as the second calibration screen A2, the bird's eye image Sa1 is displayed in the first area 21A. In the standard screen B, the single-camera image Sa2 is displayed in the second area 21B. In the second calibration screen A2, the guidance display data Sb2 is displayed in the second area 21B.

In the "IMU adjustment", a specific orientation is demanded from the work equipment 4. As illustrated in FIG. 9, the guidance display data Sb2 includes a guidance image 70 of an excavator 1G having a work equipment 4G. The guidance display data Sb2 prompts the operator to operate the operation device 10 so as to set the work equipment 4 to the specific orientation. The operator operates the left-side work lever 11 and the right-side work lever 12 of the operation device 10 while looking at the guidance display data Sb2 so as to ensure that the work equipment 4 has the orientation as indicated by the work equipment 4G in the guidance image 70. Thus, while looking at the guidance image 70, the left-side work lever 11 and the right-side work lever 12 of the operation device 10 can be operated to ensure that the work equipment has the specific orientation demanded in the "IMU adjustment".

Moreover, the guidance display data Sb2 includes a guidance text 80 that instructs the operator to perform specific operations during the "IMU adjustment". As the guidance text 80, "On a stable roadbed, set the orientation illustrated in the drawing and press NEXT after waiting for 10 seconds" is displayed on the display unit 21. Thus, while looking at the guidance text 80, the operator can set the specific orientation demanded in the "IMU adjustment".

In the state in which the actuation of the base carrier 2 is stopped and the actuation of the upper revolving structure 3 is stopped, the operator operates the left-side work lever 11 and the right-side work lever 12 of the operation device 10 so as to set the work equipment 4 to the specific orientation as illustrated in the guidance image 70. Once the work equipment 4 is adjusted to the specified orientation, after the elapse of 10 seconds, the operator operates the function switch F3 present immediately below the icon I6 including the character data "NEXT". When the function switch F3 is operated and when the stipulated time elapses, the "IMU adjustment" is ended.

Once the "IMU adjustment" is ended, the screen on the display unit 21 changes from the second calibration screen A2 to the first calibration screen A1.

In FIG. 10 is illustrated an example of the second calibration screen A2 at the time when the "boom operation adjustment" menu, which is one of the calibration menus of the excavator 1, is selected and finalized in the first calibration screen A1. When the "boom operation adjustment" menu is selected and finalized in the first calibration screen A1, the display control unit 56 changes the first calibration screen A1 to the second calibration screen A2 in the display unit 21. In the excavator 1, the calibration is performed for a command signal output to the excavator 1 and for the three-dimensional position data of the work equipment 4. When the "boom operation adjustment" menu is selected and finalized, the calibration is performed for a command signal output to the boom cylinder 5A and the three-dimensional position data of the boom 4A.

As illustrated in FIG. 10, in the second calibration screen A2 are displayed the bird's eye image Sa1, which represents the surrounding display data Sa, and the guidance display data Sb2, which represents the calibration display data Sb. Herein, the bird's eye image Sa1 and the guidance display Sb2 are displayed side-by-side. In the second calibration screen A2, the display control unit 56 displays the bird's eye image Sa1 in the first area 21A of the display unit 21 and displays the guidance display data Sb2 in the second area 21B of the display screen of the display unit 21.

As illustrated in FIGS. 7 and 10, in the standard screen B as well as the second calibration screen A2, the bird's eye image Sa1 is displayed in the first area 21A. In the standard screen B, the single-camera image Sa2 is displayed in the second area 21B. In the second calibration screen A2, the guidance display data Sb2 is displayed in the second area 21B.

In the "boom operation adjustment", a specific orientation is demanded from the work equipment 4. As illustrated in FIG. 10, the guidance display data Sb2 includes the guidance image 70 of the excavator 1G having the work equipment 4G. The guidance display data Sb2 prompts the operator to operate the operation device 10 so as to set the work equipment 4 to the specific orientation. The operator operates the left-side work lever 11 and the right-side work lever 12 of the operation device 10 while looking at the guidance display data Sb2 so as to ensure that the actual work equipment 4 has the orientation as indicated by the work equipment 4G in the guidance image 70. Thus, while looking at the guidance image 70, the left-side work lever 11 and the right-side work lever 12 of the operation device 10 can be operated to ensure that the work equipment has the specific orientation demanded in the "boom operation adjustment".

Moreover, the guidance display data Sb2 includes the guidance text 80 that instructs the operator to perform specific operations during the "boom operation adjustment". As the guidance text 80, "Set the arm vertical orientation (see the drawing below) and press NEXT" is displayed on the display unit 21. Thus, while looking at the guidance text 80, the operator can set the specific orientation demanded in the "boom operation adjustment".

In the state in which the actuation of the base carrier 2 is stopped and the actuation of the upper revolving structure 3 is stopped, the operator operates the left-side work lever 11 and the right-side work lever 12 of the operation device 10 so as to set the work equipment 4 to the specific orientation as indicated in the guidance image 70. Once the work equipment 4 is adjusted to the specified orientation, the operator operates the function switch F3 present immediately below the icon I6 including the character data "NEXT". When the function switch F3 is operated and when the stipulated time elapses, the "boom operation adjustment" is ended. Once the "boom operation adjustment" is ended, the screen on the display unit 21 changes from the second calibration screen A2 to the first calibration screen A1.

The explanation of the "IMU adjustment" menu and the "boom operation adjustment" menu, from among the calibration menus of the excavator 1, is given above with reference to FIGS. 9 and 10. As illustrated in FIG. 8, in addition to including the "IMU adjustment" menu and the "boom operation adjustment" menu, the calibration menus of the excavator 1 also includes the "bucket operation adjustment" menu and the "semiauto adjustment" menu. For each of those calibration menus, the second calibration screen A2 including the guidance display data Sb2 is displayed. Then, the operator sequentially performs the calibration according to the menus displayed in the first calibration screen A1. When the calibration of all calibration menus is completed, the display on the display unit 21 returns to the main menu screen C. After the display on the display unit 21 returns to the main menu screen C, when the operation device 10 is operated so that it switches to the operating state, the standard screen B is displayed on the display unit 21.

[Display Method]

Figure 11:
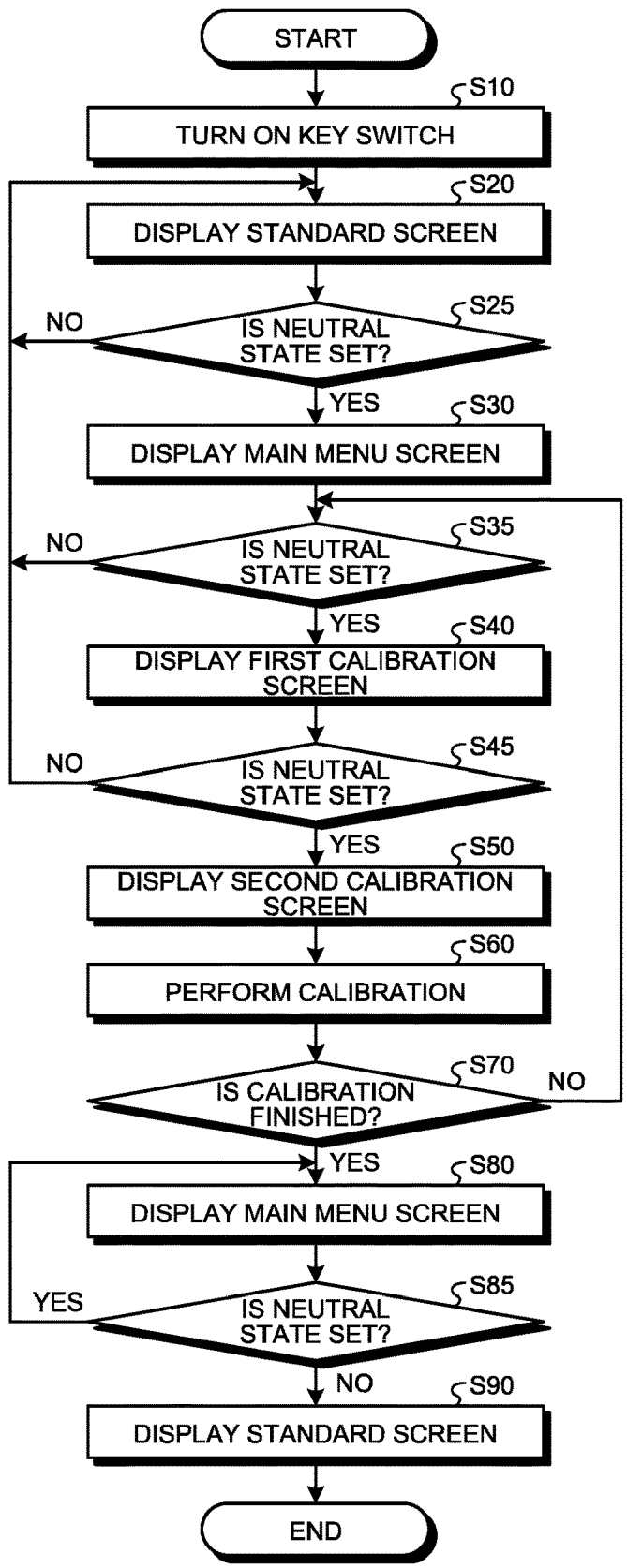
FIG. 11 is a flowchart for explaining an exemplary display method for the display device according to the present embodiment.

FIG. 11 is a flowchart for explaining an exemplary display method for the display device 20 according to the present embodiment. The operator sitting in the operating room 6 turns ON the key switch (Step S10). As a result, the excavator 1 starts up. The display control unit 56 displays the standard screen B, which is explained with reference to FIG. 7, as the initial screen on the display unit 21 (Step S20). The standard screen B includes the bird's eye image Sa1 and the single-camera image Sa2 of the surrounding of the excavator 1.

In the neutral state of the operation device 10, the operator operates the function switch F6 of the operating unit 22. As illustrated in FIG. 7, the function icon I3 for changing the standard screen B to the main menu screen C is displayed immediately above the function switching F6. In order to display the main menu screen C on the display unit 21, the operator operates the function switch F6 of the operating unit 22 in the neutral state of the operation device 10.

The operation data of the operation device 10 is output to the operation data obtaining unit 54. Based on the operation data, the determining unit 55 determines whether or not the operation device 10 is in the neutral state (Step S25).

At Step S25, if it is determined that the operation device 10 is not in the neutral state (No at Step S25), then the determining unit 55 outputs a determination signal to the display control unit 56 for indicating that the operation device 10 is in the operating state. Upon receiving from the determining unit 55 the determination signal indicating that the operation device 10 is in the operating state, the display control unit 56 does not display the main menu screen C on the display unit 21 and displays the standard screen B on the display unit 21 (Step S20). Thus, while the calibration screen B is being displayed, if the determining unit 55 determines that the operation device 10 is not in the neutral state, then the display control unit 56 continues with the display of the calibration screen B. When the operation device 10 is not in the neutral state, the display unit 21 does not switch the screen from the standard screen B to the main menu screen C.

Meanwhile, at Step S25, if it is determined that the operation device 10 is in the neutral state (Yes at Step S25), then the determining unit 55 outputs a determination signal to the display control unit 56 for indicating that the operation device 10 is in the neutral state. When the determination signal indicating that the operation device 10 is in the neutral state is obtained from the determining unit 55 and when an operation signal generated as a result of operating the function switch F6 is obtained, the display control unit 56 displays the main menu screen C on the display unit 21 (Step S30). Thus, when the operation device 10 is in the neutral state, the screen on the display unit 21 changes from the standard screen B to the main menu screen C.

As explained with reference to FIG. 5, in the main menu screen C, menus for performing the calibration are displayed. At the time of performing the calibration, the operator operates function switches in the neutral state of the operation device 10, and selects and finalizes the "calibration" menu from among a plurality of menus displayed in the main menu screen C. In the neutral state of the operation device 10, when the menu for performing the calibration is selected and finalized, the first calibration screen A1 gets displayed on the display unit 21. Thus, in order to display the first calibration screen A1 on the display unit 21, in the neutral state of the operation device 10, the operator selects and finalizes the "calibration" menu from among a plurality of menus displayed in the main menu screen C.

The operation data of the operation device 10 is output to the operation data obtaining unit 54. Based on the operation data, the determining unit 55 determines whether or not the operation device 10 is in the neutral state (Step S35).

At Step S35, if it is determined that the operation device 10 is not in the neutral state (No at Step S35), then the determining unit 55 outputs a determination signal to the display control unit 56 for indicating that the operation device 10 is in the operating state. Upon receiving from the determining unit 55 the determination signal indicating that the operation device 10 is in the operating state, the display control unit 56 does not display the first calibration screen A1 on the display unit 21 and displays the standard screen B on the display unit 21 (Step S20). That is, while the main menu screen C is being displayed, if the determining unit 55 determines that the operation device 10 is not in the neutral state, the display control unit 56 switches the screen to the standard screen B. In this way, when the operation device 10 is not in the neutral state, the screen on the display unit 21 does not change from the main menu screen C to the first calibration screen A1 but changes from the main menu screen C to the standard screen B.

Meanwhile, at Step S35, if it is determined that the operation device 10 is in the neutral state (Yes at Step S35), then the determining unit 55 outputs a determination signal to the display control unit 56 for indicating that the operation device 10 is in the neutral state. When the determination signal indicating that the operation device 10 is in the neutral state is received from the determining unit 55 and when an operation signal generated as a result of selecting and finalizing the menu for performing the calibration is obtained, the display control unit 56 displays the first calibration screen A1, which is explained with reference to FIG. 8, on the display unit 21 (Step S40). Thus, when the operation device 10 is in the neutral state, the screen on the display unit 21 changes from the main menu screen C to the first calibration screen A1.

In this way, when the determining unit 55 determines that the operation device 10 is in the neutral state, the display control unit 56 switches the display unit 21 from the main menu screen C to the first calibration screen A1. When the determining unit 55 determines that the operation device 10 is in the operating state, even if a function switch is operated, the display control unit 56 does not switch the display unit 21 from the main menu screen C to the first calibration screen A1 but switches it to the standard screen B. When it is determined that the operation device 10 is in the neutral state, the display control unit 56 does not display the surrounding display data Sa but displays the menu display data Sb1 on the display unit 21. When it is determined that the operation device 10 is in the operating state, the display control unit 56 does not display the menu display data Sb1 but displays the surrounding display data Sa on the display unit 21.

If it is determined that, while the main menu screen C is being displayed on the display unit 21, the operation device 10 is operated so that it switches to the operating state; then the display control unit 56 switches the display unit 21 from the main menu screen C to the standard screen B. The main menu C does not include the surrounding display data Sa. On the other hand, the standard screen B includes the surrounding display data Sa. That is, in the state in which the surrounding display data Sa is not being displayed on the display unit 21 (i.e., in the state in which the main menu screen C is displayed on the display unit 21), when it is determined that the operation device 10 has been operated and has switched from the neutral state to the operating state, the display control unit 56 changes the state of not displaying the surrounding display data Sa on the display unit 21 to the state of displaying the surrounding display data Sa on the display unit 21 (i.e., the state of displaying the standard screen B on the display unit 21).

The first calibration screen A1 includes the menu display data Sb1 indicating the calibration menus. In the neutral state of the operation device 10, the operator operates a function switch of the operating unit 22 and selects and finalizes one of the calibration menus. In the neutral state of the operation device 10, if, for example, the "IMU adjustment" menu is selected and finalized; then the second calibration screen, which is explained with reference to FIG. 9, is displayed on the display unit 21. In order to display the second calibration screen A2 on the display unit 21, in the neutral state of the operation device 10, the operator selects and finalizes the "IMU adjustment" menu from among a plurality of menus displayed in the first calibration screen A1.

The operation data of the operation device 10 is output to the operation data obtaining unit 54. Based on the operation data, the determining unit 55 determines whether or not the operation device 10 is in the neutral state (Step S45).

At Step S45, if it is determined that the operation device 10 is not in the neutral state (No at Step S45), then the determining unit 55 outputs a determination signal to the display control unit 56 for indicating that the operation device 10 is in the operating state. Upon receiving from the determining unit 55 the determination signal indicating that the operation device 10 is in the operating state, the display control unit 56 does not display the second calibration screen A2 on the display unit 21 and displays the standard screen B on the display unit 21 (Step S20). That is, when the operation device 10 is not in the neutral state, the screen on the display unit 21 does not change from the first calibration screen A1 to the second calibration screen A2 but changes from the first calibration screen A1 to the standard screen B.

Meanwhile, at Step S45, if it is determined that the operation device 10 is in the neutral state (Yes at Step S45), then the determining unit 55 outputs a determination signal to the display control unit 56 for indicating that the operation device 10 is in the neutral state. When the determination signal indicating that the operation device 10 is in the neutral state is received from the determining unit 55 and when an operation signal generated as a result of selecting and finalizing the menu for performing the "IMU adjustment" is obtained, the display control unit 56 displays the second calibration screen A2, which is explained with reference to FIG. 9, on the display unit 21 (Step S50). Thus, when the operation device 10 is in the neutral state, the screen on the display unit 21 changes from the first calibration screen A1 to the second calibration screen A2.

In this way, when the determining unit 55 determines that the operation device 10 is in the neutral state, the display control unit 56 switches the display unit 21 from the first calibration screen A1 to the second calibration screen A2. When the determining unit 55 determines that the operation device 10 is in the operating state, even if the menu for performing the "IMU adjustment" is selected and finalized, the display control unit 56 switches the display unit from the first calibration screen A1 not to the second calibration screen A2 but to the standard screen B. When it is determined that the operation device 10 is in the neutral state, the display control unit 56 does not display the surrounding display data Sa but displays the menu display data Sb1 on the display unit 21. When it is determined that the operation device 10 is in the operating state, the display control unit 56 does not display the menu display data Sb1 but displays the surrounding display data Sa on the display unit 21.

While the first calibration screen A1 is being displayed on the display unit 21, if the operation device 10 is operated so that it switches to the operating state, then the display control unit 56 switches the display unit 21 from the first calibration screen A1 to the standard screen B. The first calibration screen A1 does not include the surrounding display data Sa. On the other hand, the standard screen B includes the surrounding display data Sa. That is, in the state in which the surrounding display data Sa is not being displayed on the display unit 21 (i.e., in the state in which the first calibration screen A1 is displayed on the display unit 21), when it is determined that the operation device 10 has been operated and has switched from the neutral state to the operating state, the display control unit 56 changes the state of not displaying the surrounding display data Sa on the display unit 21 to the state of displaying the surrounding display data Sa on the display unit 21 (i.e., the state of displaying the standard screen B on the display unit 21).

The second calibration screen A2 includes the guidance display data Sb2 for prompting the operation of the operation device 10. In the state in which the actuation of the base carrier 2 is stopped and the actuation of the upper revolving structure 3 is stopped, the operator operates the left-side work lever 11 and the right-side work lever 12 of the operation device 10 while looking at the guidance image 70 of the guidance display data Sb2 so as to ensure that the work equipment 4 has the specific orientation; and actuates the work equipment 4.

Along with the guidance display data Sb2, the bird's eye image Sa1 of the surrounding of the excavator 1 is displayed on the display unit 21. Hence, while visually confirming the surrounding situation of the excavator 1, the operator can operate the operation device 10 so as to ensure that the work equipment is set to the specific orientation and can actuate the work equipment 4.

Moreover, as explained with reference to FIG. 9, the guidance text 80 "On a stable roadbed, set the orientation illustrated in the drawing and press NEXT after waiting for 10 seconds" is displayed on the display unit 21. After the work equipment 4 is adjusted to the specific orientation, after the elapse of 10 seconds since the adjustment of the work equipment 4 to the specific orientation, the operator operates the function switch F3 according to the guidance text 80. As explained with reference to FIG. 9, the icon I6 indicating "NEXT" is displayed immediately above the function switch F3. When the function switch F3 is operated, the calibration (the IMU adjustment) is performed (Step S60).

When the function switch F3 is operated and when the stipulated time elapses, the "IMU adjustment" is ended. Once the "IMU adjustment" is ended, the control device 23 determines whether or not all calibration menus have been processed (Step S70).

At Step S70, if it is determined that all calibration menus are not yet processed (No at Step S70) and if it is determined that the operation device 10 is in the neutral state (Yes at Step S35), then the display control unit 56 displays the first calibration screen A1, which is explained with reference to FIG. 8, on the display unit 21 (Step S40).

In the neutral state of the operation device 10, the operator operates a function switch of the operating unit 22 and selects and finalizes one of the calibration menus. If it is determined that the operation device 10 is in the neutral state (Yes at Step S45); when, for example, the "boom operation adjustment" menu is selected and finalized, the display control unit 56 displays the second calibration screen A2, which is explained with reference to FIG. 10, on the display unit 21 (Step S50).

In the state in which the actuation of the base carrier 2 is stopped and the actuation of the upper revolving structure 3 is stopped, the operator operates the left-side work lever 11 and the right-side work lever 12 of the operation device 10 while looking at the guidance image 70 of the guidance display data Sb2 so as to ensure that the work equipment 4 has the specific orientation; and actuates the work equipment 4.

The operator can operate the left-side work lever 11 and the right-side work lever 12 while looking at the bird's eye image Sa1, which is displayed along with the guidance display data Sb2, and actuate the work equipment to be in the specific orientation.

As explained with reference to FIG. 10, the guidance text 80 "Set the arm vertical orientation (see the drawing below) and press NEXT" is displayed on the display unit 21. Thus, after the work equipment is adjusted to the specific orientation, the operator operates the function switch F3 according to the guidance text 80. As explained with reference to FIG. 10, the icon I6 indicating "NEXT" is displayed immediately above the function switch F3. When the function switch F3 is operated, the calibration (the boom operation adjustment) is performed (Step S60).

When the function switch F3 is operated and when the stipulated time elapses, the "boom operation adjustment" is ended. Once the "boom operation adjustment" is ended, the control device 23 determines whether or not all calibration menus have been processed (Step S70).

Until all calibration menus are processed, the operations from Step S35 to Step S70 are repeatedly performed. When it is determined that all menus have been processed (Yes at Step S70), the display control unit 56 displays the main menu screen C on the display unit 21 (Step S80).

After the main menu screen C is displayed on the display unit 21, in order to start the work, when the operation device 10 is operated so that it switches to the operating state, the screen on the display unit 21 changes from the main menu screen C to the standard screen B. The operation data of the operation device 10 is output to the operation data obtaining unit 54. Based on the operation data, the determining unit 55 determines whether or not the operation device 10 is in the neutral state (Step S85).

At Step S85, when it is determined that the operation device 10 has been operated and has switched to the operating state (No at Step S85), the determining unit 55 outputs a determination signal to the display control unit 56 for indicating that the operation device 10 is in the operating sate. Upon receiving from the determining unit 55 the determination signal indicating that the operation device 10 is in the operating state, the display control unit 56 displays the standard screen B, which is explained with reference to FIG. 7, on the display unit 21 (Step S90). That is, when the operation device 10 is in the operating state, the screen on the display unit 21 changes from the main menu screen C to the standard screen B.

Meanwhile, at Step S85, if it is determined that the operation device 10 has not been operated and is in the neutral state (Yes at Step S85), then the determining unit 55 outputs a determination signal to the display control unit 56 for indicating that the operation device 10 is in the neutral state. Upon receiving from the determining unit 55 the determination signal indicating that the operation device 10 is in the neutral state, the display control unit 56 does not display the standard screen B on the display unit 21 and displays the main menu screen C on the display unit 21 (Step S80). That is, when the operation device 10 is not in the operating state, the screen on the display unit 21 does not change from the main menu screen C to the standard screen B. That is, when the operation device 10 is not in the operating state, the main menu screen C remains displayed.

[Effect]

As described above, according to the present embodiment, based on the image data obtained by a plurality of cameras 30 installed in the excavator 1, the surrounding display data Sa indicating the surrounding situation of the excavator 1 is generated. Moreover, the calibration display data Sb to be used in the calibration of the excavator 1 is generated. In the calibration screen A that includes the calibration display data Sb, the calibration display data Sb and the surrounding display data Sa are displayed on the same screen. Hence, when the work equipment 4 is actuated during the calibration of the excavator 1, the display device 20 can enable the operator to visually confirm the surrounding situation of the excavator 1.

During the calibration of the excavator 1, the line of sight of the operator, who is sitting in the operator seat 9, may get blocked by the power container 7 and the counter weight 8. Moreover, on the right-hand side of the operating room 6, the boom 4A moves in the vertical direction. Thus, the line of sight of the operator, who is sitting in the operator seat 9, may get blocked by the boom 4A.

In the present embodiment, during the operations of the excavator 1 as well as during the calibration of the excavator 1, the display data indicating the surrounding situation of the excavator 1 is displayed on the display device 20. Herein, the display device 20 displays at least the display data indicating the situation on the posterior side of the excavator 1 and the display data indicating the situation on the right-hand side of the excavator 1. As a result of displaying the display data of the surrounding situation of the excavator 1 on the display device 20, the operator of the excavator 1 can visually confirm the surrounding situation of the excavator 1 with ease during the operations of the excavator 1 as well as during the calibration of the excavator 1.

In the present embodiment, in the state in which the calibration screen A is displayed, even if the operation device 10 is operated, the calibration screen A is not changed to the standard screen B and, in the calibration screen A, the guidance display data Sb2 and the surrounding display data Sa are displayed. Hence, during the calibration of the excavator 1, the operator can operate the operation device 10 while looking at the surrounding display data Sa of the calibration screen A displayed on the display unit 21, and can actuate the work equipment 4.

During the operations of the excavator 1 as well as during the calibration of the excavator 1, in the operating state of the operation device 10, the display control unit 56 displays the surrounding display data Sa, which indicates the situation at least on the posterior side and the right-hand side of the excavator 1, on the display unit 21. In the operating state of the operation device 10, at the time of actuating at least one of the base carrier 2, the upper revolving structure 3, and the work equipment 4; the operator needs to visually confirm the surrounding situation of the excavator 1. In the operating state of the operation device 10, that is, when at least one of the base carrier 2, the upper revolving structure 3, and the work equipment 4 is actuated; the surrounding display data Sa is invariably displayed on the display unit 21. For that reason, when at least one of the base carrier 2, the upper revolving structure 3, and the work equipment 4 is actuated; it becomes possible to visually confirm the surrounding situation of the excavator 1.

The calibration display data Sb includes the menu display data Sb1 indicating the calibration menus and includes the guidance display data Sb2 prompting the actuation of the excavator 1. While displaying the guidance display data Sb2, the display control unit 56 displays the bird's eye image Sa1, which represents the surrounding display data Sa, alongside the guidance display data Sb2. On the other hand, while displaying the menu display data Sb1, the display control unit 56 does not display the surrounding display data Sa and displays only the menu display data Sb1.

Meanwhile, when the determining unit 55 determines that the operation device 10 is in the neutral state, the display control unit 56 displays, on the display unit 21, the first calibration screen A1 that does not include the surrounding display data Sa but includes the menu display data Sb1. When the determining unit 55 determines that the operation device 10 is in the operating state, the display control unit 56 does not display the first calibration screen A1, which includes the menu display data Sb1, on the display unit 21 but displays the standard screen B, which includes the surrounding display data Sa, on the display unit 21. In the neutral state of the operation device 10, based on the operation of a function switch, the display control unit 56 switches the display unit 21 from the main menu screen C to the first calibration screen A1. In the operation state of the operation device 10, even if a function switch is operated, the display control unit 56 switches the display unit 21 from the main menu screen C not to the first calibration screen A1 but to the standard screen B. In the neutral state of the operation device 10, when the excavator 1 has not been actuated, the surrounding display data Sa need not be displayed on the display unit 21. For that reason, in the neutral state of the operation device 10, in the first calibration screen A1, the display control unit 56 displays the menu display data Sb1 on the display unit 21 but does not display the surrounding display data Sa on the display unit 21. As a result, the display control unit 56 can display the menu display data Sb1 using a wide area of the display screen of the display unit 21. Since the menu display data Sb1 is displayed over a wide area of the display screen of the display unit 21, it becomes easier for the operator to view the menu display data. On the other hand, in the operating state of the operation device 10, when the excavator 1 is actuated, the surrounding display data Sa needs to be displayed on the display unit 21. For that reason, in the operation state of the operation device 10, the display control unit 56 displays the standard screen B including the surrounding display data Sa on the display unit 21. As a result, at the time of actuating the excavator 1, the operator becomes able to visually confirm the surrounding situation of the excavator 1.

Meanwhile, the surrounding display data Sa that is displayed in the second calibration screen A2 includes the bird's eye image Sa1 of the surrounding of the excavator 1. As a result, by looking at the bird's eye image Sa1, the operator becomes able to visually confirm, in a collective manner, the situation on the posterior side and the situation on the right-hand side of the excavator 1.

The standard screen B includes the bird's eye image Sa1 and the single-camera image Sa2, which is displayed in the same screen in which the bird's eye image Sa1 is displayed. Thus, the surrounding display data Sa displayed in the standard screen B includes the first-type surrounding display data and the second-type surrounding display data that are displayed in different display formats. As a result of displaying the surrounding situation of the excavator 1 in a plurality of display formats on the display unit 21, the operator becomes able to visually confirm the surrounding situation of the excavator 1 in a more efficient manner.

In the standard screen B as well as in the second calibration screen A2, the bird's eye image Sa1 is displayed in the first area 21A. In the standard screen B, the single-camera image Sa2 is displayed in the second area 21B; and, in the second calibration screen A2, the guidance display data Sb2 is displayed in the second area 21B. When the screen on the display unit 21 changes from the standard screen B to the second calibration screen A2, the second area 21B is changed from the state of including the single-camera image Sa2 to the state of including the guidance display data Sb2. When the screen on the display unit 21 changes from the standard screen to the second calibration screen A2, the bird's eye image Sa1 remains displayed in the first area 21A. At the time of actuating the work equipment 4, the bird's eye image Sa1 remains displayed in the first area 21A. Hence, at the time of actuating the work equipment 4, the operator becomes able to visually confirm the surrounding situation of the excavator 1 on a constant basis.

In the embodiment described above, the surrounding display data Sa conceptualized to contain the first-type surrounding display data Sa1, which represents a bird's eye image, and the second-type surrounding display data Sa2, which represents a single-camera image. Alternatively, the surrounding display data Sa can be conceptualized to contain only the first-type surrounding display data Sa1, or can be conceptualized to contain only the second-type surrounding display data Sa2, or can be conceptualized to contain the first-type surrounding display data Sa1 as well as the second-type surrounding display data Sa2. For example, the standard screen B may include at least a posterior-side single-camera image, which indicates the situation on the posterior side of the excavator 1, and a right-side single-camera image, which indicates the situation on the right-hand side of the excavator 1. With that, by looking at the posterior-side single-camera image and the right-side single camera image, the operator becomes able to visually confirm the situation on the posterior side and the right-hand side of the excavator 1.

Meanwhile, in the embodiment described above, the calibration screen A can include the guidance display data Sb2 and the single-camera image Sa2 that are displayed in the same screen. The single-camera image Sa2 that is displayed in the same screen in which the guidance display data Sb2 is displayed can include the posterior-side single-camera image as well as the right-side single-camera image. Alternatively, the calibration screen A can contain a combination of the guidance display data Sb2, the bird's eye image Sa1, and the single-camera image Sa2 that are displayed in the same screen. That is, in the calibration screen B, either only the bird's eye image Sa1 can be displayed along with the calibration display data Sb, or only the single-camera image Sb2 can be displayed along with the calibration display data Sb, or the bird's eye image Sa1 and the single-camera image Sb2 can be displayed along with the calibration display data Sb.

In the embodiment described above, the camera system 300 includes four cameras 30 (31, 32, 33, and 34). However, there can be three cameras 30 or there can be five or more cameras 30. Alternatively, there can be only one camera 30 in the camera system 300.

In the embodiment described above, the operation device 10 includes work levers (the left-side work lever 11, the right-side work lever 12, the left-side traction lever 13, and the right-side traction lever 14). Moreover, the operation device 10 can include pedals that are operated by the operator using the legs. Thus, when all work levers and all pedals are in the neutral state, the operation device 10 can be assumed to be in the neutral state. If at least one of the work levers and the pedals is in the operating state, the operation device 10 can be assumed to be in the operating state.

In the embodiment described above, the operator of the excavator 1 operates the operating unit 22 of the display device 20 and displays at least either the calibration screen A or the standard screen B on the display unit 21. Alternatively, the serviceman of the excavator 1 can operate the operating unit 22 of the display device 20 and display at least either the calibration screen A or the standard screen B on the display unit 21, and can perform calibration of the excavator 1.

In the embodiment described above, the display device 20 is installed in the operating room 6 of the excavator 1. Alternatively, the display device 20 can be installed in a remote control room from which the excavator 1 is remote-controlled or can be installed in a control room meant for managing a plurality of excavators 1 at the site of work. When the display device 20 is installed in a remote control room or a control room, the image data obtained by the cameras 30 can be sent to the display device 20 via a wireless communication system.

In the embodiment described above, the display unit 21 and the control device 23 can be separate constituent elements. For example, a display system can be built that includes the display device 20 including the display unit 21 and includes the control device 23 including the display control unit 56 which displays the calibration screen B, which includes the surrounding display data Sa and the calibration display data Sb, on the display unit 21 of the display device 20; and the display device 20 and the control device 23 can be installed as separate constituent elements. For example, the display device 20 can be installed in the operating room of the excavator 1, and the control device 23 can be installed on the outside of the excavator 1. Herein, the outside of the excavator 1 where the control device 23 is installed may imply a remote control room or a control room. Alternatively, the display device 20 as well as the control device 23, which is a separate constituent element from the display device 20, can be installed in the operating room of the excavator 1. The operating unit 22 can be installed in the display device 20 or, for example, can be installed at some other place such as a console in the operating room. Still alternatively, the display unit 21 or the control device 23 can be a smartphone or a portable computer such as a tablet computer.

In the embodiment described above, the excavator 1 is an ICT excavator that controls the work equipment 4 by collating the three-dimensional position data of the bucket 4C and the three-dimensional design aspect of the construction target. However, the excavator 1 is not limited to be an ICT excavator, and can be a regular excavator having a main menu screen and a calibration screen.

Moreover, the work machine 1 can be at least either a dump truck, or a bulldozer, or a wheel loader.

REFERENCE SIGNS LIST 1 excavator (work machine)
1G excavator
2 base carrier
3 upper revolving structure
4 work equipment
4A boom
4B arm
4C bucket
4G work equipment
5 hydraulic cylinder
5A boom cylinder
5B arm cylinder
5C bucket cylinder
6 operating room
7 power container
8 counter weight
9 operator seat
10 operation device
11 left-side work lever
12 right-side work lever
13 left-side traction lever
14 right-side traction lever
20 display device
21 display unit
21A first area
21B second area
22 operating unit
23 control device
30 camera
31 camera
32 camera
33 camera
34 camera
41 arithmetic processing device
42 memory device
43 input-output interface
51 image data obtaining unit
52 surrounding-display-data generating unit
53 calibration-display-data obtaining unit
54 operation data obtaining unit
55 determining unit
56 display control unit
57 calibration-display-data storing unit
60 single-camera-image position icon
70 guidance image
80 guidance text
300 camera system
A calibration screen
A1 first calibration screen
A2 second calibration screen
B standard screen
D reference lines
E0 frame area
E1 frame area
E2 frame area
E3 frame area
E4 frame area
F1 function switch
F2 function switch
F3 function switch
F4 function switch
F5 function switch
F6 function switch
G1 engine water-temperature gauge
G2 oil temperature gauge
G3 fuel level gauge
G4 indicator
Ia icon
Ic icon
Id icon
Ie icon
If icon
Ig icon
I1 icon
I2 icon
I3 icon
I4 icon
I5 icon
I6 icon
I7 icon
PS character image
P1 image data
P2 image data
P3 image data
P4 image data
P11 converted image data
P12 converted image data
P13 converted image data
P14 converted image data
Sa surrounding display data
Sa1 bird's eye image
Sa2 single-camera image
Sb calibration display data
Sb1 menu display data
Sb2 guidance display data

The invention claimed is:

1. A display device for a work machine comprising a display control unit that, based on image data obtained by a camera installed in the work machine, displays a calibration screen including surrounding display data which indicates surrounding situation of the work machine, and calibration display data which is used in calibration of work equipment of the work machine.

2. The display device for the work machine according to claim 1, wherein the calibration display data contains guidance display data that prompts actuation of the work equipment of the work machine.

3. The display device for the work machine according to claim 1, wherein the surrounding display data contains a bird's eye image of surrounding of the work machine.

4. The display device for the work machine according to claim 1, wherein, in case that the calibration screen is being displayed, when an operation device that is operated for actuating the work machine is determined not to be in neutral state, the display control unit continues with display of the calibration screen.

5. The display device for the work machine according to claim 4, wherein, in case that a main menu screen not including the surrounding display data is being displayed, when the operation device is determined not to be in neutral state, the display control unit switches screen to a standard screen including the surrounding display data and at least including data indicating remaining level of fuel.

6. A display system comprising:
a display device; and
a display control unit that, based on image data obtained by a camera installed in a work machine, displays a calibration screen including surrounding display data which indicates surrounding situation of the work machine, and calibration display data which is used in calibration of work equipment of the work machine, on the display device.

7. The display device for the work machine according to claim 1, wherein the guidance display data prompts actuation of the work equipment to a specific orientation to calibrate the work equipment.

8. The display device for the work machine according to claim 7, wherein the guidance display data includes guidance image showing the specific orientation of the work equipment to be performed and guidance text of calibration instructions to be performed.

9. The display device for the work machine according to claim 1, wherein the work equipment comprises a boom, an arm coupled to the boom, and a bucket coupled to the arm.

10. The display device for the work machine according to claim 1, wherein the work machine is an excavator that includes a base carrier and an upper revolving structure supporting the work equipment, and
the calibration display data is used when the calibration of the work equipment of the work machine is performed by driving the work equipment.

11. The display device for the work machine according to claim 1, wherein the display control unit displays the surrounding display data and the calibration display data side-by-side on the calibration screen.

* * * * *